(12) United States Patent
Torres Acosta et al.

(10) Patent No.: US 10,289,741 B2
(45) Date of Patent: May 14, 2019

(54) USING RELEVANT OBJECTS TO ADD CONTENT TO A COLLABORATIVE REPOSITORY

(71) Applicant: Microsoft Technology Licensing, LLC, Redmond, WA (US)

(72) Inventors: Melissa Torres Acosta, Kirkland, WA (US); Benjamin N. Truelove, Lynnwood, WA (US); Victor Poznanski, Sammamish, WA (US); John L. DeMaris, Seattle, WA (US); Carlos G. Perez, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 429 days.

(21) Appl. No.: 15/085,638

(22) Filed: Mar. 30, 2016

(65) Prior Publication Data
US 2017/0286547 A1 Oct. 5, 2017

(51) Int. Cl.
*G06F 3/0482* (2013.01)
*G06F 17/30* (2006.01)
(Continued)

(52) U.S. Cl.
CPC ...... *G06F 17/30867* (2013.01); *G06F 3/0482* (2013.01); *G06F 3/04842* (2013.01);
(Continued)

(58) Field of Classification Search
CPC .......................... G06F 17/30867; G06F 3/0482
(Continued)

(56) References Cited

U.S. PATENT DOCUMENTS 8,543,926 B2 *  9/2013  Giles .................. G06Q 10/10
                                              345/419
8,832,131 B2     9/2014  Chen et al.
(Continued)

FOREIGN PATENT DOCUMENTS

CN    104021451 A    9/2014
WO   2015127495 A1   9/2015

OTHER PUBLICATIONS

"Template Creation Basics in Google Docs", Retrieved from <<http://web.archive.org/web/20101222004317/http://google.rubissolutions.com/docs/template-creation-basics-in-google-docs>>, Dec. 22, 2010, 3 Pages.
(Continued)

*Primary Examiner* — William D Titcomb
(74) *Attorney, Agent, or Firm* — Wade IP Law LLC

(57) ABSTRACT

Techniques are described herein that are capable of using relevant objects to add content to a collaborative repository. The relevant objects are selected from URI-addressable objects based on each relevant object satisfying one or more relevance criteria. The relevant objects are recommended via a user interface. A determination is made that a specified relevant object is selected from the relevant objects. In one example, the content may be added to (e.g., created in) the collaborative repository based on the specified relevant object. In another example, the specified relevant object may be used to represent a new object type in a new content menu. For instance, the new object type may be selectable to cause an object of the new object type to be created in the collaborative repository.

25 Claims, 10 Drawing Sheets

(51) Int. Cl.
*G06F 3/0484* (2013.01)
*H04L 29/06* (2006.01)

(52) U.S. Cl.
CPC .. *G06F 17/30011* (2013.01); *G06F 17/30014* (2013.01); *G06F 17/3089* (2013.01); *H04L 65/403* (2013.01)

(58) Field of Classification Search
USPC .......................................................... 715/753
See application file for complete search history.

(56) References Cited

U.S. PATENT DOCUMENTS

| | | | |
|---|---|---|---|
| 9,122,887 B2 | 9/2015 | Drewry et al. | |
| 9,146,975 B2 | 9/2015 | Chintala et al. | |
| 9,166,991 B2 | 10/2015 | Trugman | |
| 9,195,667 B2 | 11/2015 | Avery et al. | |
| 9,223,528 B2* | 12/2015 | Tecu | G06F 3/1275 |
| 9,270,728 B2* | 2/2016 | Duncker | G06F 17/30873 |
| 2007/0106951 A1* | 5/2007 | McCormack | G06F 17/248 |
| | | | 715/764 |
| 2009/0307598 A1* | 12/2009 | Giles | G06Q 10/10 |
| | | | 715/738 |
| 2009/0327358 A1 | 12/2009 | Lukiyanov et al. | |
| 2010/0005411 A1 | 1/2010 | Duncker et al. | |
| 2012/0266128 A1* | 10/2012 | Kato | G06Q 30/02 |
| | | | 717/101 |
| 2014/0195899 A1* | 7/2014 | Bastide | G06F 17/24 |
| | | | 715/256 |
| 2016/0021183 A1* | 1/2016 | Bowman | G06F 17/50 |
| | | | 709/204 |

OTHER PUBLICATIONS

"International Search Report and Written Opinion Issued in PCT Application No. PCT/US2017/024217", dated May 29, 2017, 14 Pages.
"M-Files", Published on: Mar. 25, 2015, 2 pages, Available at: http://www.m-files.com/en/top-ecm-features-new.
Linder, Josh, "Dropbox for Business Review", Published on: Apr. 28, 2015, 7 pages, Available at: http://www.tomsitpro.com/articles/dropbox-for-business-review,2-852.html.
"FileCloud provides Secure Access to Enterprise Data from Any Device", Retrieved on: Dec. 24, 2015, 1 page, Available at: https://www.getfilecloud.com/enterprise-file-synchronization-and-sharing/.
"OmniDocs Enterprise Content Management (ECM) Suite", Published on: Mar. 18, 2015, 8 pages, Available at: http://www.newgensoft.com/products/enterprise-content-management-omnidocs/.
"IBM Knowledge Center", Retrieved on: Dec. 24, 2015, 6 pages, Available at: https://www-01.ibm.com/support/knowledgecenter/SSEUEX_2.0.3/com.ibm.installingeuc.doc/eucao009.htm.
Swanson, et al., "Integrating External Document Repositories with SharePoint Server 2007", Published on: Feb. 2009, 11 pages, Available at: https://msdn.microsoft.com/en-us/library/office/dd440954%28v=office.12%29.aspx.

* cited by examiner

USING RELEVANT OBJECTS TO ADD CONTENT TO A COLLABORATIVE REPOSITORY

BACKGROUND

A collaborative repository is a repository that is configured to enable multiple users to perform collaborative operations with regard to content. For instance, the collaborative repository may enable the users to collaboratively edit the content. The collaborative repository may have additional functionality, such as tracking (e.g., version history tracking), managing, and securing the content and synchronizing the content across multiple devices.

Regardless whether a user creates a new collaborative repository or attempts to use a collaborative repository that is created by someone else, the user typically wants to store content in the collaborative repository so that other users may collaborate with the user regarding the content. If the content already exists, the user often clicks through folders in a file system to locate the content, right-clicks the content to initiate a copy or move operation, navigates back to a folder that represents the collaborative repository, and right clicks in the folder to paste the content therein. If the content does not yet exist, the user often starts from scratch to generate the content.

SUMMARY

Various approaches are described herein for, among other things, using relevant objects to add content to a collaborative repository. Examples of content include but are not limited to a document (e.g., a file), a folder, and a link (e.g., a hyperlink). Examples of a document include but are not limited to a webpage, a word processing document, a spreadsheet, a slideshow, a Portable Document Format (PDF) document, and a list. A relevant object is an object that satisfies one or more relevance criteria. A relevance criterion may require that an operation has been performed on an object by a user or person(s) in a group that includes the user, that an object has been identified in a message, that an object is of a specified object type, that subject matter of an object (e.g., derived from tags, metadata, or a body of the object) matches reference subject matter, that an object has at least a threshold popularity (e.g., number of likes, shares, views, or tags), that popularity of an object is increasing at a rate that is greater than or equal to a threshold rate, that an object is stored at a specified location, that any of the above occur within a designated period of time, etc.

In a first example approach, a request is received from a user of a collaborative repository to create content in the collaborative repository. Relevant objects are selected from uniform resource identifier-addressable (URI-addressable) objects based on each relevant object satisfying one or more relevance criteria with regard to the request. The relevant objects are recommended via a user interface based on each relevant object satisfying the one or more relevance criteria. A determination is made that the user selects a specified relevant object from the relevant objects. The content is created in the collaborative repository based on the specified relevant object.

In a second example approach, a request is received from a user to add a new object type in a new content menu. The new content menu includes interface elements that correspond to respective object types. Each interface element is selectable to create an object of the respective object type. Relevant objects are selected from URI-addressable objects based on each relevant object satisfying one or more relevance criteria with regard to the request. The relevant objects are recommended via a user interface based on each relevant object satisfying the one or more relevance criteria. A determination is made that the user selects a specified relevant object from the relevant objects. The specified relevant object is used to represent the new object type in the new content menu.

In a third example approach, a determination is made that a user creates the collaborative repository. Relevant objects that are external to the collaborative repository are selected from URI-addressable objects based on each relevant object satisfying one or more relevance criteria with regard to the collaborative repository. The relevant objects are recommended via a user interface based on each relevant object satisfying the one or more relevance criteria. A determination is made that the user selects a specified relevant object from the relevant objects. The content is added to the collaborative repository. The content is based on the specified relevant object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
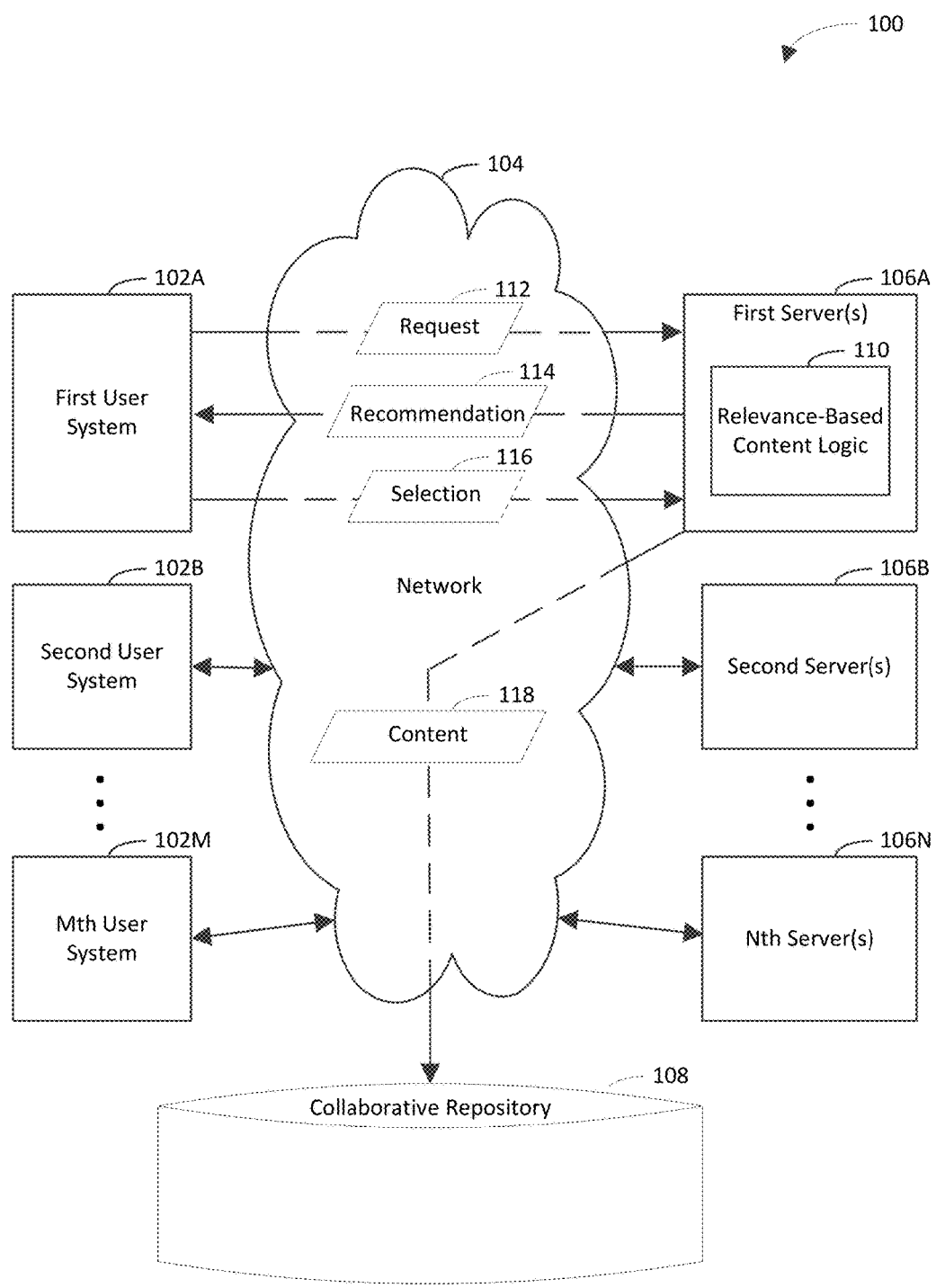
FIG. 1 is a block diagram of an example relevance-based content system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of using relevant objects to add content to a collaborative repository. Examples of content include but are not limited to a document (e.g., a file), a folder, and a link (e.g., a hyperlink). Examples of a document include but are not limited to a webpage, a word processing document, a spreadsheet, a slideshow, a Portable Document Format (PDF) document, and a list. A relevant object is an object that satisfies one or more relevance criteria. A relevance criterion may require that an operation has been performed on an object by a user or person(s) in a group that includes the user, that an object has been identified in a message, that an object is of a specified object type, that subject matter of an object (e.g., derived from tags, metadata, or a body of the object) matches reference subject matter, that an object has at least a threshold popularity (e.g., number of likes, shares, views, or tags), that popularity of an object is increasing at a rate that is greater than or equal to a threshold rate, that an object is stored at a specified location, that any of the above occur within a designated period of time, etc.

Example techniques described herein have a variety of benefits as compared to conventional techniques for adding content to a collaborative repository. For instance, the example techniques may simplify a process for adding the content to the collaborative repository. The example techniques may reduce an amount of time and/or resources (e.g., processor, memory, network bandwidth) that are consumed to add the content to the collaborative repository. The example embodiments may increase efficiency of a computing device that is used to add the content to the collaborative repository. The example techniques may increase user efficiency (e.g., by reducing a number of steps that a user takes to add the content to the collaborative repository). For instance, recommending relevant objects to be added to the collaborative repository may reduce (e.g., eliminate) a need for a user to manually search for such objects.

FIG. 1 is a block diagram of an example relevance-based content system 100 in accordance with an embodiment. Generally speaking, relevance-based content system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, relevance-based content system 100 uses relevant objects to add content to a collaborative repository. For instance, the collaborative repository Detail regarding techniques for using relevant objects to add content to a collaborative repository is provided in the following discussion.

As shown in FIG. 1, relevance-based content system 100 includes a plurality of user systems 102A-102M, a network 104, a plurality of servers 106A-106N, and a collaborative repository 108. Communication among user systems 102A-102M, servers 106A-106N, and collaborative repository 108 is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 104A-104N, so that user systems 102A-102M may access information that is available via the domains. Such domain may include Web pages, which may be provided as hypertext markup language (HTML) documents and objects (e.g., files) that are linked therein, for example.

User systems 102A-102M may include any client-enabled system or device, including but not limited to a desktop computer, a laptop computer, a tablet computer, a personal digital assistant, a cellular telephone, a wearable device, or the like. It will be recognized that any one or more user systems 102A-102M may communicate with any one or more servers 106A-106N.

Servers 106A-106N are processing systems that are capable of communicating with user systems 102A-102M. Servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, servers 106A-106N are configured to host respective Web sites, so that the Web sites are accessible to users of relevance-based content system 100.

One example type of a computer program that may be executed by one or more of servers 106A-106N is a content collaboration program (e.g., content collaboration platform). A content collaboration program is a computer program that enables users (e.g., at any of user systems 102A-102M) to perform collaborative operations with regard to content that is stored in collaborative repository 108. For example, the content collaboration program may communicate with collaborative repository 108 to enable the users to perform the collaborative operations. In another example, a portion or all of the content collaboration program may be incorporated into collaboration repository 108. Examples of a content collaboration program include but are not limited to SharePoint® and OneDrive® developed and distributed by Microsoft Corporation, Google Drive™ developed and distributed by Google Inc., Box™ developed and distributed by Box, Inc., Dropbox® developed and distributed by Dropbox, Inc., and Slack® developed and distributed by Slack Technologies, Inc. It will be recognized that the example techniques described herein may be implemented using a content collaboration program.

First server(s) 106A is shown to include relevance-based content logic 110 for illustrative purposes. Relevance-based content logic 110 is configured to use relevant objects to add content to collaborative repository 106. For example, relevance-based content logic 110 may receive a request 112 from first user system 102A. The request 112 may solicit creation of content (e.g., content 118) in collaborative repository 108. Upon receiving the request 112, relevance-based content logic 110 may select relevant objects from uniform resource identifier-addressable (URI-addressable) objects based on each relevant object satisfying one or more relevance criteria with regard to the request 112. A URI-addressable object is an object that is capable of being addressed using a uniform resource identifier (URI). Examples of a URI include but are not limited to a uniform resource locator (URL) and a uniform resource name (URN). Relevance-based content logic 110 may provide a recommendation 114 to first user system 102A based on each relevant object satisfying the one or more relevance criteria. The recommendation 114 may identify the relevant objects to potentially be added to collaborative repository 108. Relevance-based content logic 110 may receive a selection 116 from first user system 102A. The selection 116 may indicate that a specified relevant object has been selected from the relevant objects. Relevance-based content logic 110 may create the content 118 in collaborative repository 108 based on the selection 116 indicating that the specified relevant object has been selected.

In another example, the request 112 may solicit addition of a new object type in a new content menu. The new content menu includes interface elements that correspond to respective object types. Each interface element is selectable to create an object of the respective object type. Upon receiving the request 112, relevance based content logic 110 may select relevant objects from URI-addressable objects based on each relevant object satisfying one or more relevance criteria with regard to the request 112. Relevance-based content logic 110 may provide a recommendation 114 to first user system 102A based on each relevant object satisfying the one or more relevance criteria. The recommendation 114 may identify the relevant objects to potentially represent the new object type in the new content menu. Relevance-based content logic 110 may receive a selection 116 from first user system 102A. The selection 116 may indicate that a specified relevant object has been selected from the relevant objects. Relevance-based content logic 110 may use the specified relevant object to represent the new object type in the new content menu based on the selection 116 indicating that the specified relevant object has been selected.

In yet another example, relevance-based content logic 110 determines that a user creates collaborative repository 108. Relevance-based content logic 110 selects relevant objects that are external to collaborative repository 108 from URI-addressable objects based on each relevant object satisfying one or more relevance criteria with regard to collaborative repository 108. Relevance-based content logic 110 may provide a recommendation 114 to first user system 102A based on each relevant object satisfying the one or more relevance criteria. The recommendation 114 may identify the relevant objects to potentially be added to collaborative repository 108. Relevance-based content logic 110 may receive a selection 116 from first user system 102A. The selection 116 may indicate that a specified relevant object has been selected from the relevant objects. Relevance-based content logic 110 may add the content 118 to collaborative repository 108 based on the selection 116 indicating that the specified relevant object has been selected. In accordance with this example, the content may be based on the specified relevant object.

It should be noted that as the user selects relevant objects from those that are recommended to the user, the relevancy of subsequently recommended objects may be greater than the relevancy of objects that were previously recommended. For instance, relevance-based content logic 110 may develop a model of the user or a group to which the user belongs. Relevance-based content logic 110 may develop and/or refine the model using online learning, for example.

It will be recognized that relevance-based content logic 110 may be (or may be included in) a content collaboration program, though the scope of the example embodiments is not limited in this respect. Example techniques for using relevant objects to add content to a collaborative repository are discussed in greater detail below with reference to FIGS. 2-9.

Relevance-based content logic 110 may be implemented in various ways to use relevant objects to add content to a collaborative repository, including being implemented in hardware, software, firmware, or any combination thereof. For example, relevance-based content logic 110 may be implemented as computer program code configured to be executed in one or more processors. In another example, relevance-based content logic 110 may be implemented as hardware logic/electrical circuitry. For instance, relevance-based content logic 110 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Relevance-based content logic 110 is shown to be incorporated in first server(s) 106A for illustrative purposes and is not intended to be limiting. It will be recognized that relevance-based content logic 110 (or any portion(s) thereof) may be incorporated in any one or more of the user systems 102A-102M. For example, client-side aspects of relevance-based content logic 110 may be incorporated in one or more of the user systems 102A-102M, and server-side aspects of relevance-based content logic 110 may be incorporated in first server(s) 106A. In another example, relevance-based content logic 110 may be distributed among the user systems 102A-102M. In yet another example, relevance-based content logic 110 may be incorporated in a single one of the user systems 102A-102M. In another example, relevance-based content logic 110 may be distributed among the server(s)

106A-106N. In still another example, relevance-based content logic 110 may be incorporated in a single one of the server(s) 106A-106N.

Figure 2:
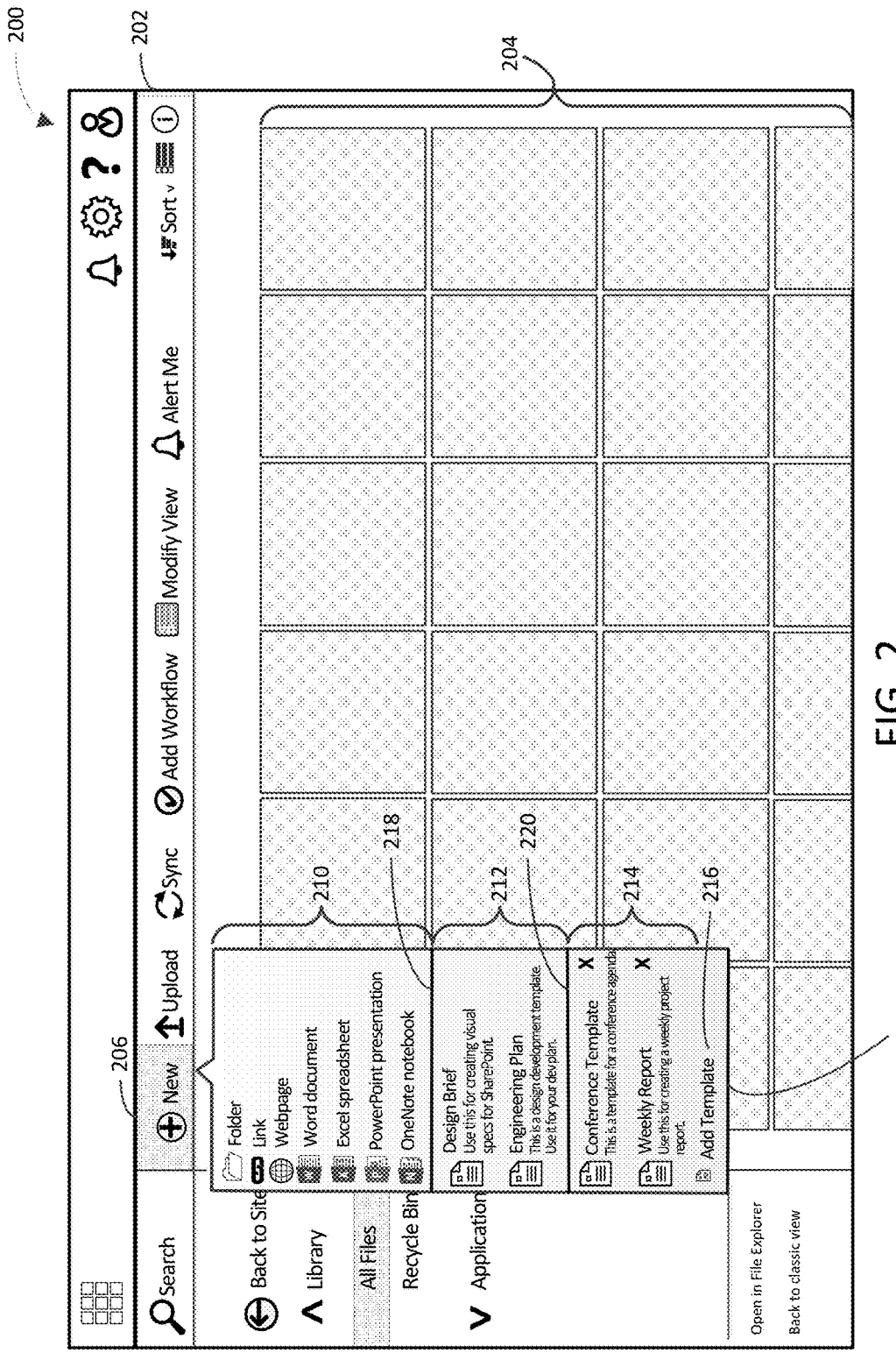
FIGS. 2-5 are example screenshots of a user interface in accordance with embodiments.

FIGS. 2-5 are example screenshots 200, 300, 400, and 500 of a user interface in accordance with embodiments. As shown in FIG. 2, screenshot 200 shows a menu bar 202 and a plurality of tiles 204. The menu bar 202 includes a plurality of interface elements (e.g., virtual buttons) that are selectable to cause respective menus to be displayed via the user interface. For instance, FIG. 2 indicates that a "New" button is selected, causing a new content menu 208 to be displayed via the user interface. The new content menu 208 shows selectable interface elements corresponding to respective object types. In particular, the object types include pre-defined, non-templated object types 210, administrative pins and templated object types 212, and team pins and templated object types 214. The pre-defined, non-templated object types 210 are empty object types having respective formats. For instance, the pre-defined, non-templated object types 210 may be pre-defined by a collaborative repository program that is used to generate the user interface. The pre-defined, non-templated object types 210 include the following object types: folder, link, webpage, Word document, Excel spreadsheet, PowerPoint presentation, and OneNote notebook for illustrative purposes.

The administrative pins and templated object types 212 are generated by person(s) having administrator privileges (e.g., a system administrator). The administrative pins and templated object types 212 include the following object types: design brief and engineering plan. In the new content menu 208, a description is provided for each of the administrative pins and templated object types 212. For instance, text beneath the interface element corresponding to the design brief object type states, "Use this for creating visual specs for SharePoint." Accordingly, this interface element may be selected to use a template having characteristics defined by the design brief object type for creation of an object (e.g., a document that includes SharePoint® visual specifications) to be stored in a collaborative repository (e.g., collaborative repository 108). Text beneath the interface element corresponding to the engineering plan object type states, "This is a design development template. Use it for your dev plan." Accordingly, this interface element may be selected to use a template having characteristics defined by the engineering plan object type for creation of an object (e.g., a development plan) to be stored in the collaborative repository.

The team pins and templated object types 214 are generated by users without the use of administrator privileges (e.g., by users who do not have administrator privileges). For instance, the team pins and templated object types 214 may be generated by team members (e.g., for a specific project or task associated with the team). The team pins and templated object types 214 include the following object types: conference template and weekly report. In the new content menu 208, a description is provided for each of the team pins and templated object types 214. For instance, text beneath the interface element corresponding to the conference template object type states, "This is a conference agenda." Accordingly, this interface element may be selected to invoke a template having characteristics defined by the conference template object type as a starting point for creating an agenda for an upcoming conference. For instance, the template may have some fields completed and other fields left blank so that the blank fields may be filled by the user when creating the agenda. Text beneath the interface element corresponding to the weekly report object type states, "Use this for creating a weekly project report." Accordingly, this interface element may be selected to invoke a template having characteristics defined by the weekly report object type as a starting point for creating a weekly report for a project on which the team is working. An "X" is placed proximate each of the team pins and templated object types 214 to indicate that the team pins and templated object types 214 may be removed from the new content menu 208 by the user. For example, the X that is proximate the conference template object type may be selected by the user to remove the conference template object type from the new content menu 208. In another example, the X that is proximate the weekly report object type may be selected by the user to remove the weekly report object type form the new content menu 208.

In addition to listing the object types 210, 212, and 214, the new content menu 208 may list one or more objects of a designated type. For example, one or more relevant Word documents may be listed under the Word document object type in the new content menu 208. Each of the relevant Word documents may be selectable by the user to create a new Word document based on the selected Word document. For instance, the selected Word document may serve as a template for the new Word document. The new content menu 208 may include relevant objects of any number of object types.

The pre-defined, non-templated object types 210 are separated from the administrative pins and templated object types 212 by a first horizontal line 218 for illustrative purposes to visually distinguish between the pre-defined, non-templated object types 210 and the administrative pins and templated object types 212. The administrative pins and templated object types 212 are separated from the team pins and templated object types 214 by a second horizontal line 220 for illustrative purposes to visually distinguish between the administrative pins and templated object types 212 and the team pins and templated object types 214. It will be recognized that the new content menu 208 need not necessarily include the first horizontal line 218 and/or the second horizontal line 220.

The new content menu 208 includes an interface element labeled "Add template" (the add template interface element 216). The add template interface element 216 is selectable to initiate creation of a template to be stored in the collaborative repository and/or to be represented in the new content menu 208.

Figure 3:
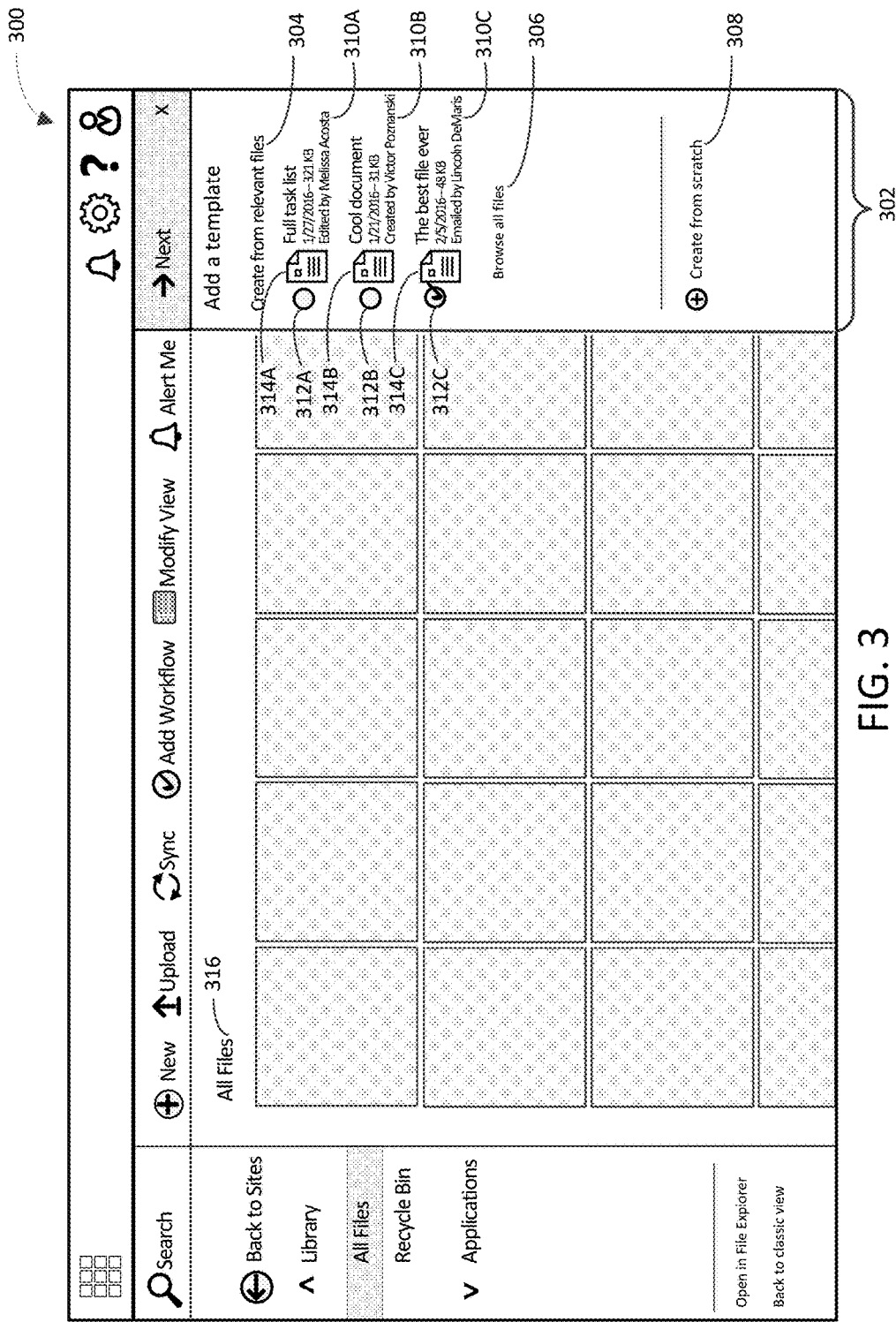

FIG. 3 is a screenshot 300 of an example result of selecting the add template interface element 216 shown in FIG. 2. As shown in FIG. 3, screenshot 300 includes a window 302 that identifies multiple options for creating a template. For example, first text 304 indicates that a template may be created from a relevant file. The window 302 includes interface elements corresponding to respective relevant files 314A-314C that are recommended to the user. The relevant files 314A-314C are associated with respective radio buttons 312A-312C. Each of the radio buttons 312A-312C may be selected to create a template based on the associated relevant file. As shown in FIG. 2, the radio button 312C associated with the relevant file 314C is selected to indicate that a template is to be created based on the relevant file 314C (e.g., using the relevant file 314C as a template for creating the new template).

The window 302 includes reasons 310A-310C that the respective relevant files 314A-314C are recommended to the user. For instance, reason 310A indicates that relevant file 314A was edited by Melissa Acosta. For instance, Melissa Acosta may be a colleague of the user. Reason 310B indicates that Victor Poznanski created relevant file 314B. For instance, Victor Poznanski may be working with the user on a project. Reason 310C indicates that relevant file 314C was emailed to someone by Lincoln DeMaris. For instance, Lincoln DeMaris may be a manager of the user, and the relevant object 314C may have metadata that corresponds to keyword(s) associated with the collaborative repository.

In some example embodiments, relevant objects (e.g., relevant files 314A-314C) may be filtered based on one or more user-selected factors. Such factors may include any one or more of the criteria described herein for selecting relevant objects and/or any other factor(s). For example, a user may indicate that only objects that are created, accessed, and/or modified by person(s) specified by the user are to be included in relevant objects that are recommended to the user. In another example, the user may indicate that only recent objects that match a set of keywords that are pertinent to the collaborative repository are to be included in relevant objects that are recommended to the user. In yet another example, the user may indicate that only files that user has recently opened and that were originally created from template(s) in a designated library are to be included in relevant objects that are recommended to the user. In still another example, the user may indicate that only files that user has recently opened and that have reached a stage in a file workflow at which the files are designated as "final" are to be included in relevant objects that are recommended to the user.

Second text 306 indicates that all files may be browsed to locate a file on which the new template is to be based. For instance, selecting the second text 306 may cause another window to be displayed via the user interface, showing a list of all files. Third text 308 indicates that the new template may be created from scratch. For instance, selecting the third text 308 may cause a blank file to be opened so that the user may manually complete the file (e.g., manually fill fields in the file).

The tiles 204 represent all files that are stored in the collaborative repository, as indicated by the text 316 labeled "All Files."

Figure 4:
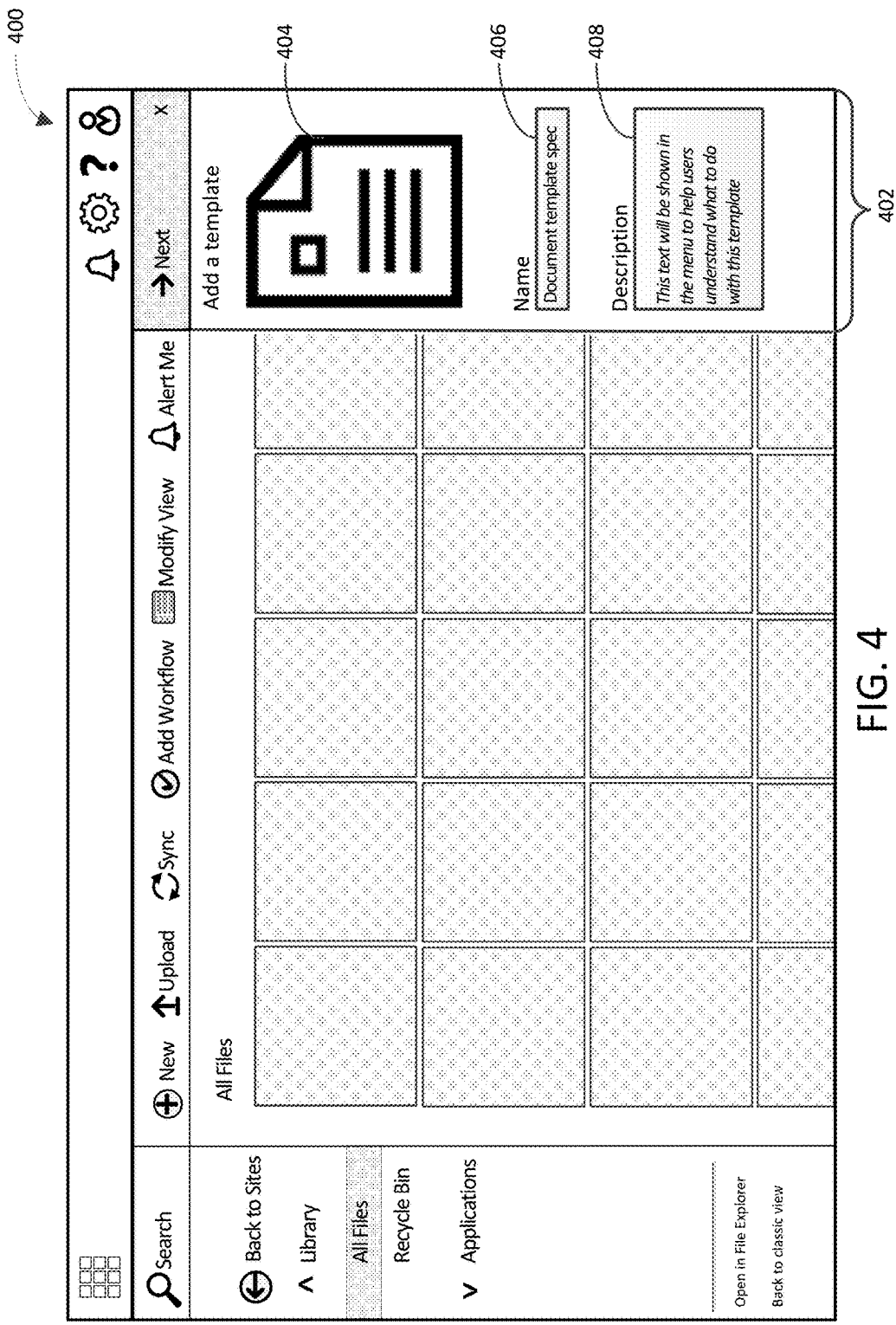

FIG. 4 is a screenshot 400 of an example result of selecting the interface element that represents the relevant file 314C shown in FIG. 3. As shown in FIG. 4, screenshot 400 includes a window 402 that includes a preview 404 of the relevant file 314C. Window 402 further includes a first text window 406 and a second text window 408. The first text window 406 is configured to receive a name of the new template that is being created. For instance, the first text window 406 is shown to be filled with the name "Document template spec" for illustrative purposes. The second text window 408 is configured to receive a description of the template that is being created. The second text window 408 is shown to be filled with default language, stating "This text will be shown in the menu to help users understand what to do with this template," for illustrative purposes.

Figure 5:
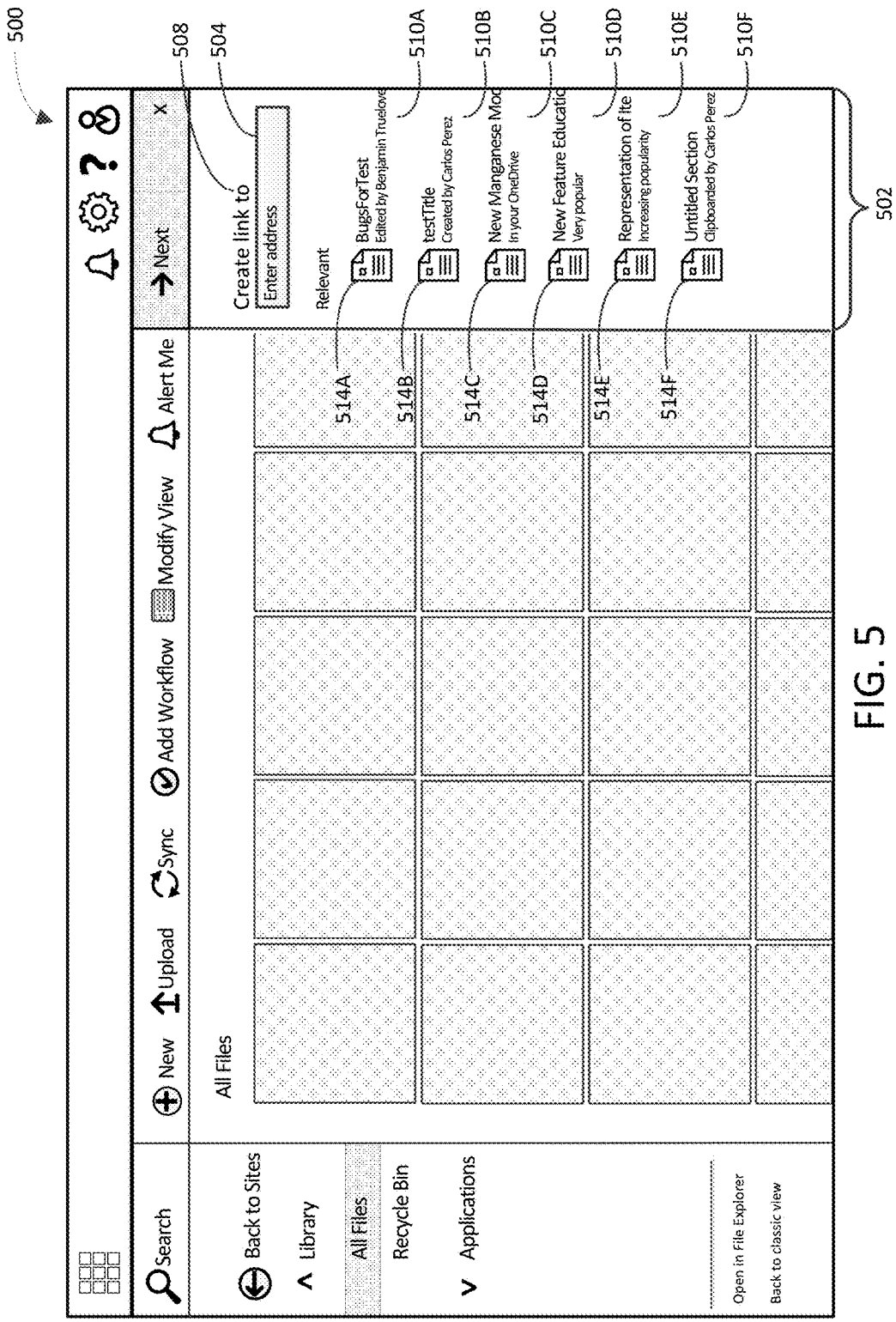

FIG. 5 is a screenshot 500 of an example result of selecting the link object type shown in FIG. 2. As shown in FIG. 5, screenshot 500 includes a window 502 that includes a text window 504 and interface elements corresponding to respective relevant objects 514A-514F that are recommended to the user for facilitating the creation of a link to an object. For example, a link to an object may be created by entering an address of the object in the text window 504, as indicated by the text 508 labeled "Create link to." In another example, a link may be created by selecting an interface element corresponding to a respective relevant object.

The window 502 includes reasons 510A-510F that the respective relevant files 514A-514F are recommended to the user. For instance, reason 510A indicates that relevant file 514A was edited by Benjamin Truelove. Reason 510B indicates that Carlos Perez created relevant file 514B. Reason 510C indicates that relevant file 514C is located in the user's OneDrive®. Reason 510D indicates that relevant object 514D is very popular. For instance, relevant object 514D may have a number of likes, shares, views, or tags that exceeds a popularity threshold. Reason 510E indicates that a popularity of relevant object 514E is increasing. For instance, the number of likes, shares, views, or tags associated with relevant object 514E may be increasing at a rate that exceeds a popularity growth rate threshold. Reason 510F indicates that Carlos Perez added relevant object 514F to his clipboard.

Figure 6:
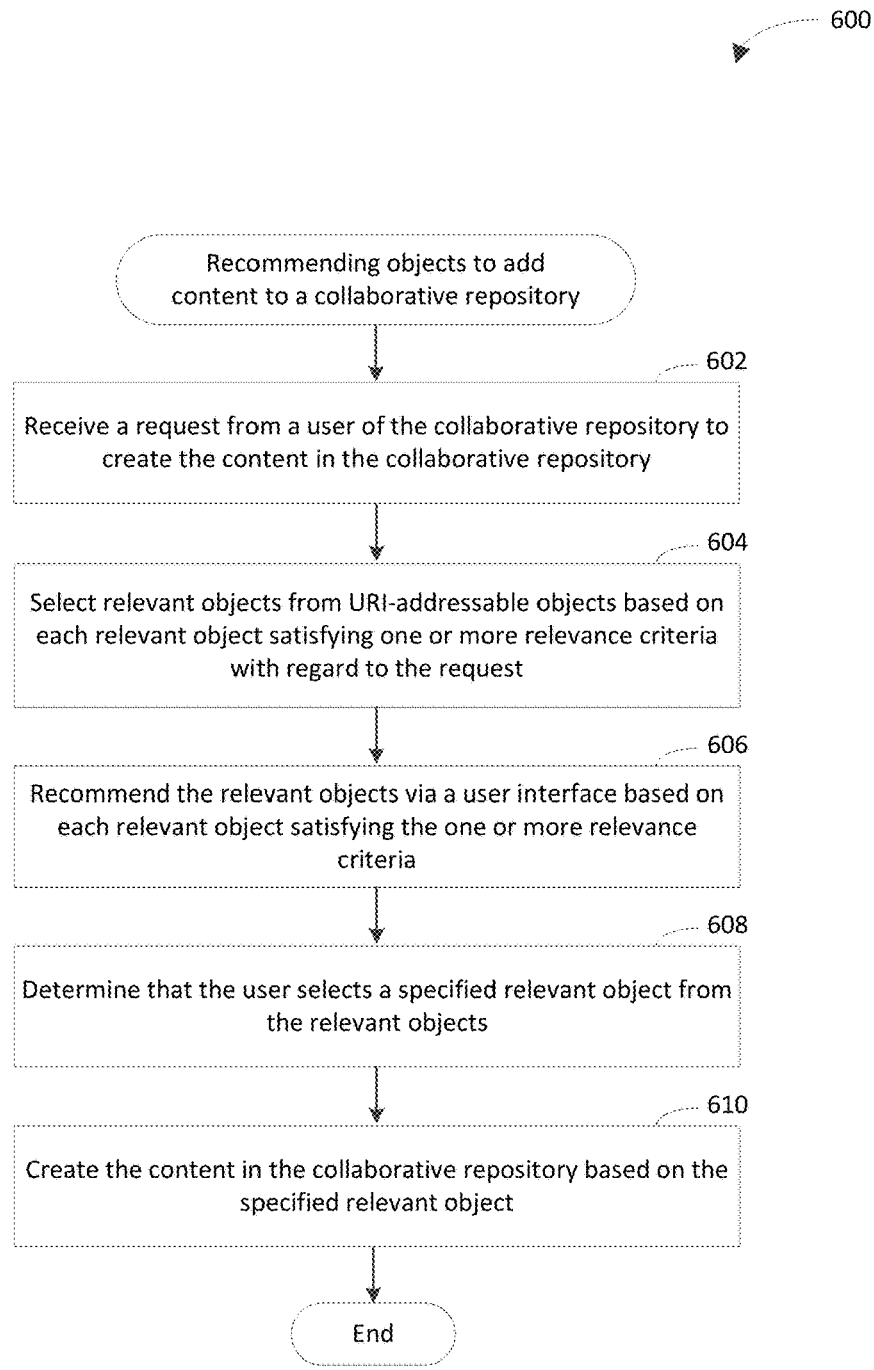
FIGS. 6 and 7 depict flowcharts of example methods for recommending objects to add content to a collaborative repository in accordance with embodiments.
Figure 7:
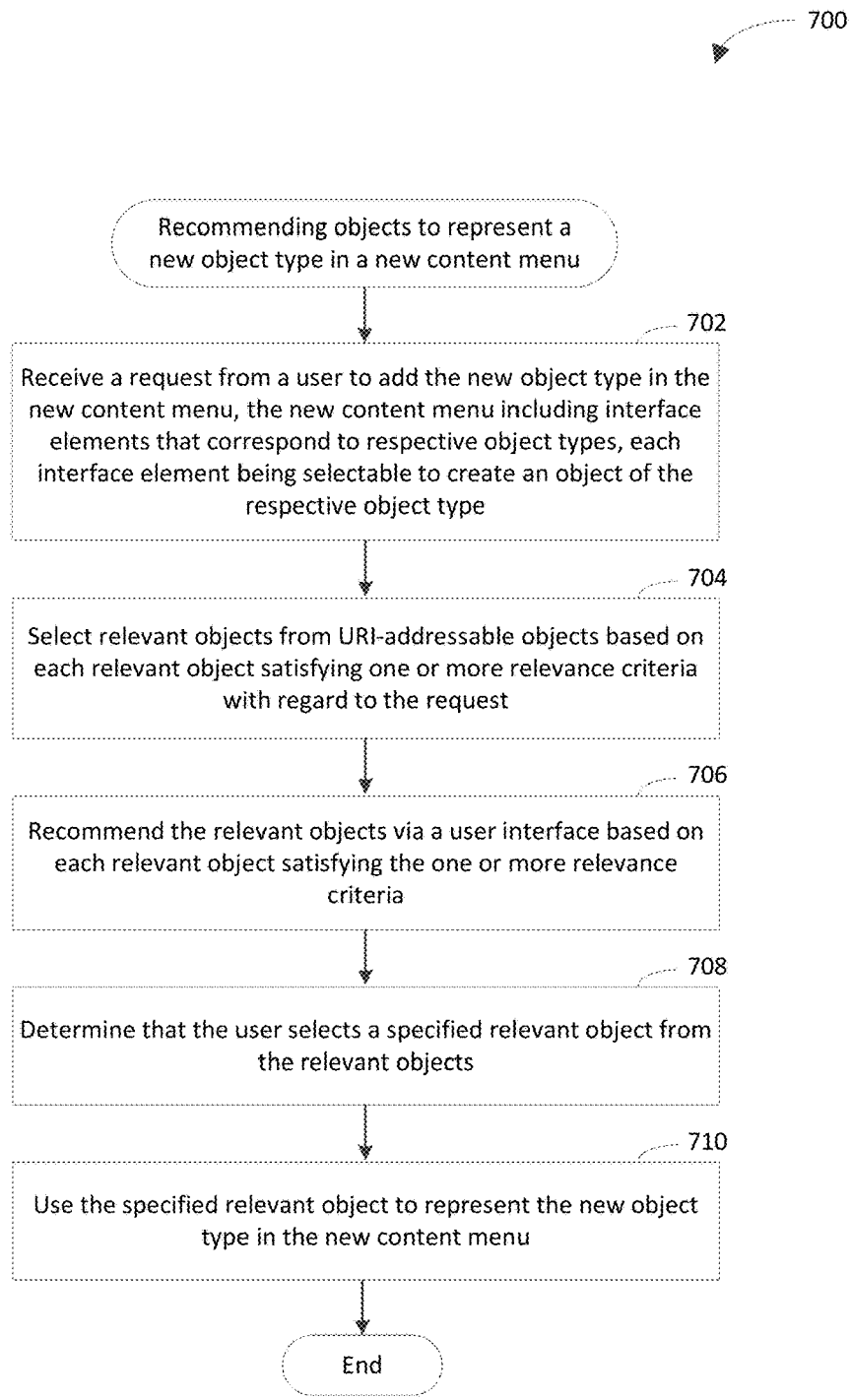
Figure 8:
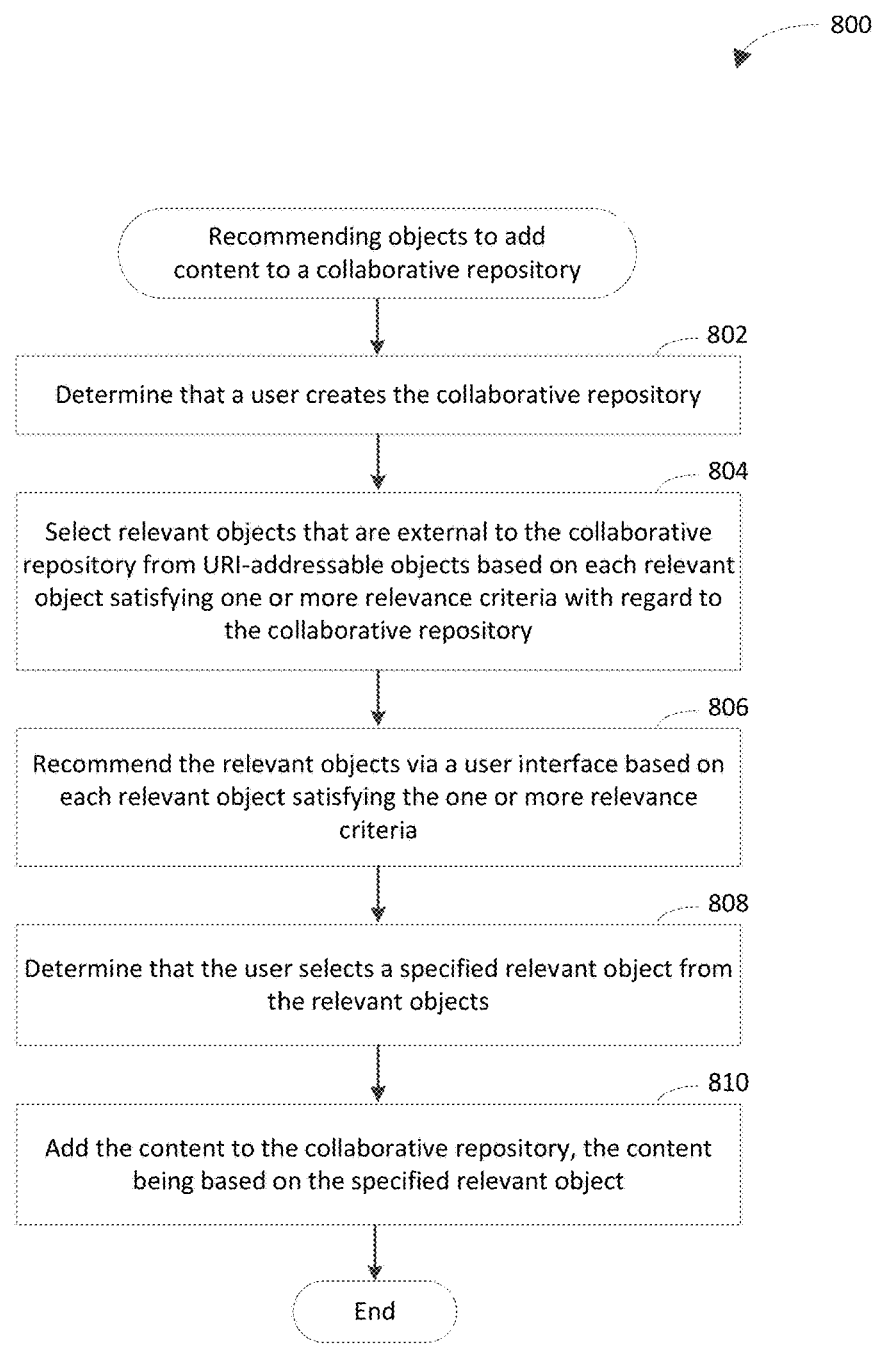
FIG. 8 depicts a flowchart of an example method for recommending objects to represent a new object type in a new content menu in accordance with an embodiment.
Figure 9:
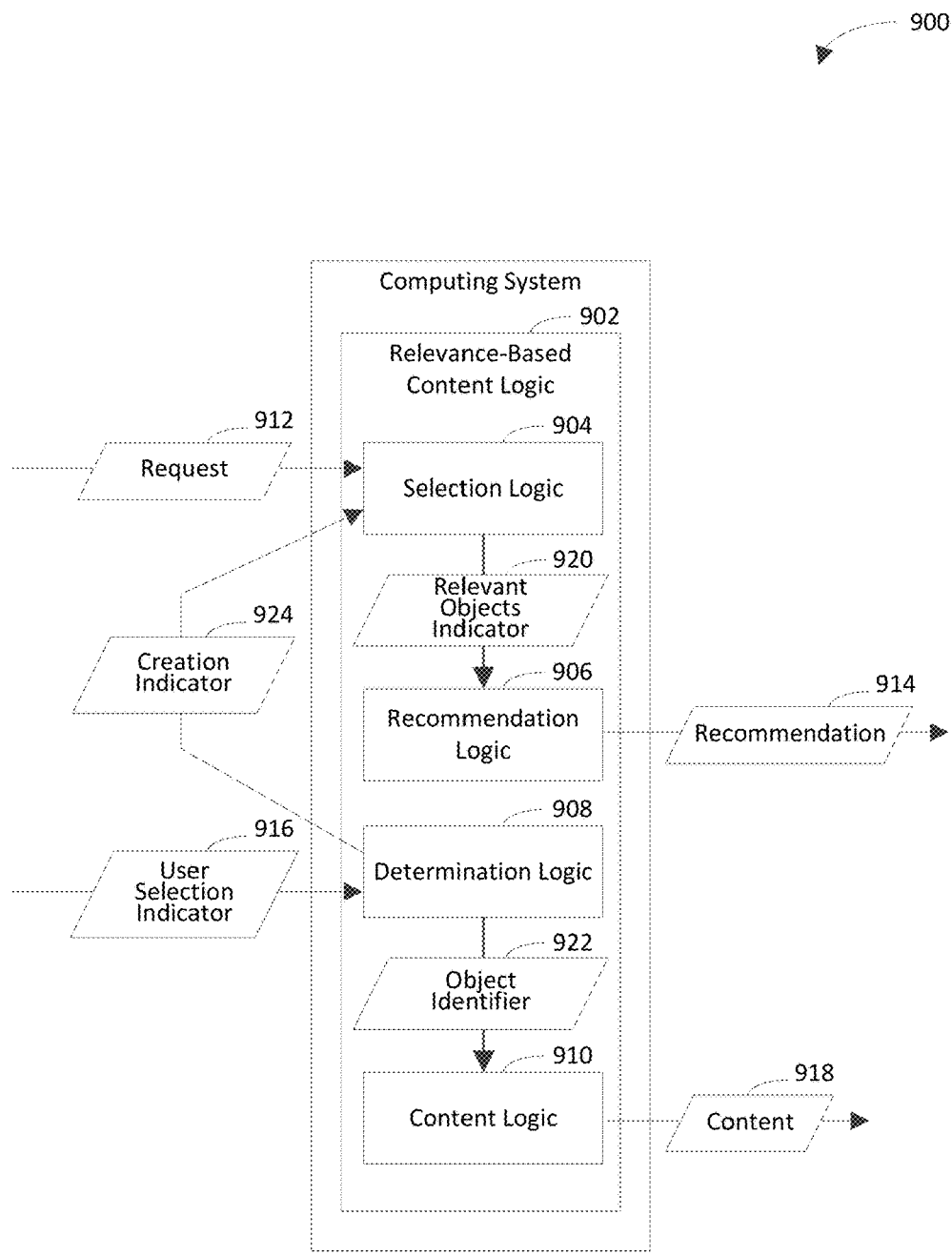
FIG. 9 is a block diagram of an example computing system in accordance with an embodiment.

FIGS. 6 and 7 depict flowcharts 600 and 700 of example methods for recommending objects to add content to a collaborative repository in accordance with embodiments. FIG. 8 depicts a flowchart 800 of an example method for recommending objects to represent a new object type in a new content menu in accordance with an embodiment. Flowcharts 600, 700, and 800 may be performed by relevance-based content logic 110 shown in FIG. 1, for example. For illustrative purposes, flowcharts 600, 700, and 800 are described with respect to computing system 900 shown in FIG. 9. Computing system 900 may include one or more user systems 102A-102M, one or more of server(s) 106A-106N, or any combination thereof, though the scope of the example embodiments is not limited in this respect. Computing system 900 includes relevance-based content logic 902, which is an example of relevance-based content logic 110, according to an embodiment. As shown in FIG. 9, relevance-based content logic 902 includes selection logic 904, recommendation logic 906, determination logic 908, and content logic 910. Further structural and operational embodiments will be apparent to persons skilled in the relevant art(s) based on the discussion regarding flowcharts 600, 700, and 800.

As shown in FIG. 6, the method of flowchart 600 begins at step 602. In step 602, a request is received from a user of the collaborative repository to create the content in the collaborative repository. In an example implementation, selection logic 904 receives a request 912 to create the content in the collaborative repository is received from the user of the collaborative repository.

At step 604, relevant objects are selected from uniform resource identifier-addressable (URI-addressable) objects based on each relevant object satisfying one or more relevance criteria with regard to the request. A URI-addressable object is an object that is capable of being addressed using a uniform resource identifier (URI). Examples of a URI include but are not limited to a uniform resource locator (URL) and a uniform resource name (URN). In an example implementation, selection logic 904 selects the relevant objects from the URI-addressable objects based on each relevant object satisfying one or more relevance criteria with regard to the request 912. In accordance with this implementation, selection logic 904 may generate a relevant object indicator 920 in response to selecting the relevant objects. The relevant object indicator 920 may specify (e.g., identify) the relevant objects.

In an example embodiment, one or more (e.g., all) of the relevant objects are selected based on each relevant object satisfying one or more relevance criteria with regard to the user from whom the request is received. For instance, the one or more relevant objects may be tailored (e.g., personalized) to the user or to a group of persons that includes the user.

At step 606, the relevant objects are recommended via a user interface based on each relevant object satisfying the one or more relevance criteria. For instance, the relevant objects may be recommended to be used for satisfaction of the request based on each relevant object satisfying the one or more relevance criteria. In an example implementation, recommendation logic 906 recommends the relevant objects. For example, recommendation logic 906 may recommend the relevant objects in response to (e.g., based on) receipt of the relevant objects indicator 920. In accordance with this example, recommendation logic 906 may recommend the relevant objects based on (e.g., based at least in part on) the relevant objects indicator 920 specifying the relevant objects. Recommendation logic 906 may generate a recommendation 914, which specifies the relevant objects, to recommend the relevant objects via the user interface.

In an example embodiment, recommending the relevant objects at step 606 includes specifying via the user interface, for each of one or more first relevant objects (e.g., two or more, three or more, etc.), at least one relevance criterion that the respective first relevant object satisfies to cause the respective first relevant object to be recommended via the user interface. The one or more first relevant objects may include all of the relevant objects, though the scope of the example embodiments is not limited in this respect. In an aspect of this embodiment, recommending the relevant objects at step 606 may include providing one or more interface elements via the user interface to represent the one or more respective first relevant objects. In accordance with this aspect, recommending the relevant objects at step 606 may include providing via the user interface, for each of the one or more first relevant objects, a textual description of the respective at least one relevance criterion proximate the interface element that represents the respective first relevant object. A relevance criterion may require that a person (e.g., other than the user) has performed an action with regard to a first relevant object. For instance, a relevance criterion may require that a person has created, accessed, or modified a first relevant object.

In yet another example embodiment, recommending the relevant objects at step 606 includes ranking the relevant objects based on an extent to which each relevant object satisfies the one or more relevance criteria and/or a number of criteria that are satisfied by each relevant object.

At step 608, a determination is made that the user selects a specified relevant object from the relevant objects. For example, the determination may be made that the user selects the specified relevant object to be used for satisfaction of the request. In another example, the determination may be made in response to recommending the relevant objects at step 606. The user may select the specified relevant object in any suitable manner. For instance, the user may right-click, drag-and-drop, double-click, hover (e.g., for a designated duration of time), or gesture (e.g., point a finger, gaze, or blink) with regard to the specified relevant object to select the specified relevant object. In an example implementation, determination logic 908 determines that the user selects the specified relevant object. For example, determination logic 908 may make the determination in response to receipt of a user selection indicator 916. In accordance with this example, determination logic 908 may make the determination based on the user selection indicator 916 indicating that the specified relevant object is selected. Determination logic 908 may generate an object identifier 922 in response to determining that the user selects the specified relevant object. For example, the object identifier 922 may indicate that the specified relevant object is selected. In another example, the object identifier 922 may include an instruction that instructs content logic 910 to create the content based on the specified relevant object.

At step 610, the content is created in the collaborative repository based on the specified relevant object. For instance, the content may be created in response to determining that the user selects the specified relevant object at step 608. In an example implementation, content logic 910 creates content 918 in the collaborative repository based on the specified relevant object. For example, content logic 910 may create content 918 in response to receipt of the object identifier 922. In accordance with this example, content logic 910 may create the content in the collaborative repository based on the specified relevant object based on the object identifier 922 indicating that the specified relevant object is selected and/or based on the object identifier 922 including an instruction that instructs content logic 910 to create the content based on the specified relevant object.

In an example embodiment, the request is a request to create a link (e.g., hyperlink) in the collaborative repository. In accordance with this embodiment, the relevant objects are external to the collaborative repository. In an aspect of this embodiment, recommending the relevant objects at step 606 may include recommending the relevant objects to be referenced by the link. In another aspect, recommending the relevant objects at step 606 may include providing a recommendation that specifies the relevant objects as potential target objects to be referenced by the link. In accordance with this aspect, providing the recommendation may be triggered by the request from the user. In yet another aspect of this embodiment, determining that the user selects the specified relevant object from the relevant objects at step 608 may include determining that the user selects the specified relevant object to be referenced by the link. In further accordance with this embodiment, creating the content in the collaborative repository at step 610 includes creating the link to the specified relevant object in the collaborative repository. For example, the link may be created in response to determining that the user selects the specified relevant object at step 608. In another example, the link may be created without changing a physical location of the specified relevant object.

In another example embodiment, the request is a request to create a new object in the collaborative repository. In accordance with this embodiment, the relevant objects are completed objects. A completed object is an object that includes sufficient information to be used in a non-template context. In further accordance with this embodiment, the specified relevant object is a specified completed object. In an aspect of this embodiment, recommending the relevant objects at step 606 may include recommending the completed objects for use as a template to create the new object. In another aspect of this embodiment, recommending the relevant objects at step 606 may include providing a recommendation that specifies the completed objects as potential templates to be used to create the new object. In accordance with this aspect, providing the recommendation may be triggered by the request from the user. In yet another aspect of this embodiment, determining that the user selects the specified relevant object from the relevant objects at step 608 may include determining that the user selects the specified completed object to be used as a template to create the new object. In further accordance with this embodiment, creating the content in the collaborative repository includes creating the new object in the collaborative repository using the specified completed object as a template in response to determining that the user selects the specified completed object. For example, the new object may be created to have a pre-established formatting, layout, metadata, and/or content of the specified completed object. In accordance with this example, the pre-established formatting, layout, metadata, and/or content in the new object may be modified by the user.

In an aspect of this embodiment, the request is a request to use a pre-defined template to create the new object. In accordance with this aspect, selecting the relevant objects at step 604 includes selecting the completed objects based on each completed object of the plurality of completed objects being created using the pre-defined template. In further accordance with this aspect, recommending the relevant objects includes recommending the completed objects based on each completed object being created using the pre-defined template.

In another aspect of this embodiment, the request is a request to create the new object of a designated object type. In accordance with this aspect, selecting the relevant objects at step 604 includes selecting the completed objects based on each completed object being of the designated object type. In further accordance with this embodiment, recommending the relevant objects at step 606 includes recommending the completed objects based on each completed object being of the designated object type. In further accordance with this aspect, creating the content at step 610 includes creating the new object of the designated object type in the collaborative repository using the specified completed object as the template.

In an example of this aspect, receiving the request at step 602 includes receiving the request from the user based on the user selecting the designated object type from a plurality of object types specified in a first menu. In accordance with this example, recommending the relevant objects at step 606 includes providing a second menu that specifies the completed objects based on each completed object being of the designated object type.

In yet another aspect of this embodiment, selecting the completed objects includes selecting one or more completed objects based on each of the one or more completed objects being of a designated object type. In accordance with this aspect, recommending the completed objects includes providing a menu that includes interface elements. The interface elements include first interface elements and second interface elements. The first interface elements identify respective object types that include the designated object type. The second interface element identify the one or more completed objects of the designated object type. In further accordance with this aspect, determining that the user selects the specified completed object includes determining that the user selects the specified completed object from the one or more completed objects in response to providing the menu. It should be noted that a selection of the menu by the user may constitute the request from the user. For instance, the user need not necessarily select an object type from the menu in order for the request to be received from the user.

In still another aspect of this embodiment, selecting the completed objects includes selecting one or more first completed objects to be included in the completed objects further based on each of the one or more first completed objects being designated as finalized in a workflow of the respective completed object. In accordance with this aspect, recommending the completed objects includes recommending the one or more first completed objects via the user interface further based on each of the one or more first completed objects being designated as finalized in the workflow of the respective completed object.

In yet another example embodiment, selecting the relevant objects at step 604 includes selecting one or more first relevant objects to be included in the relevant objects based on each of the one or more first relevant objects being created in the collaborative repository within a threshold period of time prior to a reference time (e.g., a current time). For instance, the one or more first relevant objects may be selected based on each of the one or more first relevant objects being create in the collaborative repository by the user or by a person who is within a designated social proximity to the user (e.g., a person with whom the user works and/or collaborates) within the threshold period of time prior to the reference time. In accordance with this embodiment, recommending the relevant objects at step 606 includes recommending the one or more first relevant objects via the user interface based on each of the one or more first relevant objects being created in the collaborative repository within the threshold period of time prior to the reference time.

In still another example embodiment, selecting the relevant objects at step 604 includes selecting one or more first relevant objects to be included in the relevant objects based on each of the one or more first relevant objects being created from a template that is included in a designated library (e.g., in which the content is to be created) in the collaborative repository. In accordance with this embodiment, recommending the relevant objects at step 606 includes recommending the one or more first relevant objects via the user interface based on each of the one or more first relevant objects being created from a template that is included in the designated library in the collaborative repository. It will be recognized that any of the one or more first relevant objects may be created from a different template than any other(s) of the one or more first relevant objects. It will be further recognized that any of the one or more first relevant objects may be created from a same template as any other(s) of the one or more first relevant objects.

In another example embodiment, selecting the relevant objects at step 604 includes selecting one or more first relevant objects to be included in the relevant objects based on each of the one or more first relevant objects being accessed (e.g., opened or read) and/or modified (e.g., edited) within a threshold period of time prior to a reference time (e.g., a current time). For instance, the one or more first relevant objects may be selected based on each of the one or more first relevant objects being accessed and/or modified by the user or by a person who is within a designated social proximity to the user (e.g., a person with whom the user works and/or collaborates) within the threshold period of time prior to the reference time. In accordance with this embodiment, recommending the relevant objects at step 606 includes recommending the one or more first relevant objects via the user interface based on each of the one or more first relevant objects being accessed and/or modified within the threshold period of time prior to the reference time.

In still another example embodiment, selecting the relevant objects at step 604 includes selecting one or more first relevant objects to be included in the relevant objects based on each of the one or more first relevant objects being identified by a message that is sent within a threshold period of time prior to a reference time (e.g., a current time). Example of a message include but are not limited to an email, an instant message (IM), a short message service (SMS) message, and a social update. In one aspect, a first relevant object may be identified by a message by being attached to the message. In another aspect, a first relevant object may be identified by a message by having a name of the first relevant object mentioned in a subject line or a body of the message. In yet another aspect, selecting the relevant objects at step 604 may include selecting the one or more first relevant objects to be included in the relevant objects based on each of the one or more first relevant objects being identified by a message that is sent by the user or by a person who is within a designated social proximity to the user (e.g., a person with whom the user works and/or collaborates) within the threshold period of time prior to the reference time. In accordance with this embodiment, recommending the relevant objects at step 606 includes recommending the one or more first relevant objects via the user interface based on each of the one or more first relevant objects being identified by a message that is sent within the threshold period of time prior to the reference time. It will be recognized that any of the one or more first relevant objects may be identified by a different message than any other(s) of the one or more first relevant objects. It will be further recognized that any of the one or more first relevant objects may be identified by a same message as any other(s) of the one or more first relevant objects.

In an example embodiment, selecting the relevant objects at step 604 includes selecting one or more first relevant objects to be included in the relevant objects based on each of the one or more first relevant objects being added to a clipboard within a threshold period of time prior to a reference time (e.g., a current time). For instance, selecting the relevant objects at step 604 may include selecting the one or more first relevant objects to be included in the relevant objects based on each of the one or more first relevant objects being added to a clipboard by the user or by a person who is within a designated social proximity to the user (e.g., a person with whom the user works and/or collaborates) within the threshold period of time prior to the reference time. In accordance with this embodiment, recommending the relevant objects at step 606 includes recommending the one or more first relevant objects via the user interface based on each of the one or more first relevant objects being added to a clipboard within the threshold period of time prior to the reference time.

In yet another example embodiment, selecting the relevant objects at step 604 includes selecting one or more first relevant objects to be included in the relevant objects based on each of the one or more first relevant objects having a number of likes, a number of shares, a number of views, and/or a number of tags that exceeds a threshold. In accordance with this embodiment, recommending the relevant objects at step 606 includes recommending the one or more first relevant objects via the user interface based on each of the one or more first relevant objects having a number of likes, a number of shares, a number of views, and/or a number of tags that exceeds the threshold.

In still another example embodiment, selecting the relevant objects at step 604 includes selecting one or more first relevant objects to be included in the relevant objects based on each of the one or more first relevant objects having a number of likes, a number of shares, a number of views, and/or a number of tags that increases with respect to time (e.g., over a designated period of time) at a rate that exceeds a threshold rate. In accordance with this embodiment, recommending the relevant objects at step 606 includes recommending the one or more first relevant objects via the user interface based on each of the one or more first relevant objects having a number of likes, a number of shares, a number of views, and/or a number of tags that increases with respect to time at a rate that exceeds the threshold rate.

In another example embodiment, selecting the relevant objects at step 604 includes selecting one or more first relevant objects to be included in the relevant objects based on each of the one or more first relevant objects having one or more tags that are used by the user and/or a person who is within a designated social proximity to the user within a threshold period of time prior to a reference time (e.g., a current time). For instance, a person within a designated social proximity to the user may be a person who works with the user and/or who collaborates the user (e.g., on a project that utilizes one or more objects that are stored in the collaborative repository). In accordance with this embodiment, recommending the relevant objects includes recommending the one or more first relevant objects via the user interface based on each of the one or more first relevant objects having the one or more tags that are used by the user and/or the person who is within the designated social proximity to the user within the threshold period of time prior to the reference time.

In yet another example embodiment, selecting the relevant objects at step 604 includes selecting one or more first relevant objects to be included in the relevant objects based on a topic of each of the one or more first relevant objects matching a reference topic. For instance, a topic may match a reference topic by being the same as the reference topic, being semantically the same as the reference topic, and/or having a calculated (e.g., statistical) relevance to the reference topic that is greater than or equal to a relevance threshold. In one example, the relevance threshold may be fixed. In another example, the relevance threshold may be relative to the calculated relevance of other first relevant object(s) to the reference topic. The topic of each of the one or more first relevant objects may be based on (e.g., specified by or inferred from) content of the respective first relevant object and/or other information associated with the respective first relevant object. For instance, a topic of a first relevant object may be based on (e.g., specified by or inferred from) a name, a title, and/or a subject of the first relevant object, one or more words and/or key fields in the first relevant object, metadata of the first relevant object, queries that have been used to search for the first relevant object, and/or other information associated with the first relevant object. The reference topic may be based on (e.g., specified by or inferred from) a name of the collaborative repository, tag(s) and/or keyword(s) associated with the collaborative repository, name(s) of object(s) in the collaborative repository, metadata and/or other information associated with object(s) in the collaborative repository, and/or other information associated with the collaborative repository. In accordance with this embodiment, recommending the relevant objects includes recommending the one or more first relevant objects via the user interface based on the topic of each of the one or more first relevant objects matching the reference topic.

In still another example embodiment, selecting the relevant objects at step 604 includes selecting one or more first relevant objects to be included in the relevant objects based on each of the one or more first relevant objects being stored in a store with which the user is associated (e.g., a user's OneDrive® or personal hard drive). In accordance with this embodiment, recommending the relevant objects at step 606 includes recommending the one or more first relevant objects via the user interface based on each of the one or more first relevant objects being stored in the store with which the user is associated.

In some example embodiments, one or more steps 602, 604, 606, 608, and/or 610 of flowchart 600 may not be performed. Moreover, steps in addition to or in lieu of steps 602, 604, 606, 608, and/or 610 may be performed. For instance, in an example embodiment, the method of flowchart 600 further includes receiving an indicator from the user. The indicator specifies at least one user-selected relevance criterion that is selected by the user. In an example implementation, selection logic 904 receives the indicator. In accordance with this embodiment, selecting the relevant objects at step 604 includes selecting the relevant objects based on each relevant object satisfying the one or more relevance criteria, including the at least one user-selected relevance criterion.

As shown in FIG. 7, the method of flowchart 700 begins at step 702. In step 702, a request is received from a user to add the new object type in the new content menu. The new content menu includes interface elements that correspond to respective object types. Each interface element is selectable to create an object of the respective object type. In an example implementation, selection logic 904 receives a request 912 to add the new object type in the new content menu from the user.

At step 704, relevant objects are selected from URI-addressable objects based on each relevant object satisfying one or more relevance criteria with regard to the request. In an example implementation, selection logic 904 selects the relevant objects form the URI-addressable objects.

At step 706, the relevant objects are recommended via a user interface based on each relevant object satisfying the one or more relevance criteria. In an example implementation, recommendation logic 906 recommends the relevant objects via the user interface.

At step 708, a determination is made that the user selects a specified relevant object from the relevant objects. For instance, the determination may be made in response to recommending the relevant objects at step 706. In an example implementation, determination logic 908 determines that the user selects the specified relevant object from the relevant objects.

At step 710, the specified relevant object is used to represent the new object type in the new content menu. For instance, the specified relevant object may be used to represent the new object type in the new content menu in response to determining that the user selects the specified relevant object at step 708. In an example implementation, content logic 910 uses the specified relevant object to represent the new object type in the new content menu. For example, content logic 910 may use the specified relevant object to represent the new object type in the new content menu in response to receipt of the object identifier 922. In accordance with this example, the object identifier may instruct content logic 910 to use the specified relevant object to represent the new object type in the new content menu.

In an example embodiment, using the specified relevant object to represent the new object type in the new content menu at step 710 includes creating a new object using the specified relevant object as a template to represent the new object type in the new content menu in response to determining that the user selects the specified relevant object at step 708.

It will be recognized that any of the example criteria described above (e.g., with reference to FIG. 6) is applicable to the embodiment of FIG. 7. It will be further recognized that any of the embodiments described above with reference to FIG. 6 are applicable to the embodiment of FIG. 7.

In some example embodiments, one or more steps 702, 704, 706, 708, and/or 710 of flowchart 700 may not be performed. Moreover, steps in addition to or in lieu of steps 702, 704, 706, 708, and/or 710 may be performed.

As shown in FIG. 8, the method of flowchart 800 begins at step 802. In step 802, a determination is made that a user creates the collaborative repository. In an example implementation, determination logic 908 determines that the user creates the collaborative repository. Determination logic 908 may generate a creation indicator 924 in response to determining that the user creates the collaborative repository. For example, the creation indicator 924 may specify that the user creates the collaborative repository. In accordance with this example, the creation indicator 924 may include an instruction that instructs selection logic 904 to select relevant objects with regard to the collaborative repository.

At step 804, relevant objects that are external to the collaborative repository are selected from URI-addressable objects based on each relevant object satisfying one or more relevance criteria with regard to the collaborative repository. For instance, selecting the relevant objects may be triggered by creation of the collaborative repository. In an example implementation, selection logic 904 selects the relevant objects that are external to the collaborative repository from the URI-addressable objects based on each relevant object satisfying one or more relevance criteria with regard to the collaborative repository. For example, selection logic 904 may select the relevant objects in response to receipt of the creation indicator 924. In accordance with this example, selection logic 904 may select the relevant objects based on the creation indicator 924 specifying that the user creates the collaborative repository and/or based on the creation indicator 924 instructing selection logic 904 to select the relevant objects.

At step 806, the relevant objects are recommended via a user interface based on each relevant object satisfying the one or more relevance criteria. In an example implementation, recommendation logic 906 recommends the relevant objects via the user interface.

At step 808, a determination is made that the user selects a specified relevant object from the relevant objects. For instance, the determination may be made in response to recommending the relevant objects at step 806. In an example implementation, determination logic 908 determines that the user selects the specified relevant object from the relevant objects.

At step 810, the content is added to the collaborative repository. The content is based on the specified relevant object. For instance, the content may be added to the collaborative repository in response to determining that the user selects the specified relevant object at step 808. In an example implementation, content logic 910 adds content 918 to the collaborative repository. In accordance with this implementation, the content 918 is based on the specified relevant object.

In an example embodiment, adding the content to the collaborative repository at step 810 includes creating the content in the collaborative repository based on the specified relevant object in response to determining that the user selects the specified relevant object at step 808. In an aspect of this embodiment, creating the content includes creating a link to the specified relevant object in the collaborative repository. In another aspect of this embodiment, creating the content includes creating a new object in the collaborative repository using the specified relevant object as a template.

In another example embodiment, adding the content to the collaborative repository at step 810 includes making a copy of the specified relevant object. In accordance with this embodiment, adding the content at step 810 further includes storing the copy of the specified relevant object in the collaborative repository in response to determining that the user selects the specified relevant object at step 808.

In yet another example embodiment, adding the content to the collaborative repository at step 810 includes moving the specified relevant object from a location that is external to the collaborative repository to the collaborative repository in response to determining that the user selects the specified relevant object at step 808.

It will be recognized that any of the example criteria described above (e.g., with reference to FIG. 6) is applicable to the embodiment of FIG. 8. It will be further recognized that any of the embodiments described above with reference to FIG. 6 are applicable to the embodiment of FIG. 8.

In some example embodiments, one or more steps 802, 804, 806, 808, and/or 810 of flowchart 800 may not be performed. Moreover, steps in addition to or in lieu of steps 802, 804, 806, 808, and/or 810 may be performed.

It will be recognized that computing system 900 may not include one or more of logic 904, recommendation logic 906, determination logic 908, and/or content logic 910. Furthermore, computing system 900 may include components in addition to or in lieu of logic 904, recommendation logic 906, determination logic 908, and/or content logic 910.

It will be recognized that computing system 900 may not include one or more of selection logic 904, recommendation logic 906, determination logic 908, and/or content logic 910. Furthermore, computing system 900 may include components in addition to or in lieu of selection logic 904, recommendation logic 906, determination logic 908, and/or content logic 910.

Any one or more of relevance-based content logic 110, relevance-based content logic 902, selection logic 904, recommendation logic 906, determination logic 908, content logic 910, flowchart 600, flowchart 700, and/or flowchart 800 may be implemented in hardware, software, firmware, or any combination thereof.

For example, any one or more of relevance-based content logic 110, relevance-based content logic 902, selection logic 904, recommendation logic 906, determination logic 908, content logic 910, flowchart 600, flowchart 700, and/or flowchart 800 may be implemented, at least in part, as computer program code configured to be executed in one or more processors.

In another example, any one or more of relevance-based content logic 110, relevance-based content logic 902, selection logic 904, recommendation logic 906, determination logic 908, content logic 910, flowchart 600, flowchart 700, and/or flowchart 800 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

In a first example method of recommending objects to add content to a collaborative repository, a request is received from a user of the collaborative repository to create the content in the collaborative repository. A plurality of relevant objects are selected from a plurality of URI-addressable objects, using at least one element that includes at least one of (a) one or more processors, (b) physical hardware, or (c) electrical circuitry, based on each relevant object of the plurality of relevant objects satisfying one or more relevance criteria with regard to the request. The plurality of relevant objects is recommended via a user interface, using the at least one element, based on each relevant object of the plurality of relevant objects satisfying the one or more relevance criteria. A determination is made that the user selects a specified relevant object from the plurality of relevant objects, using the at least one element, in response to recommending the plurality of relevant objects. The content is created in the collaborative repository based on the specified relevant object, using the at least one element, in response to determining that the user selects the specified relevant object.

In a first aspect of the first example method, receiving the request from the user of the collaborative repository comprises receiving the request from the user of the collaborative repository to create a link in the collaborative repository. In accordance with the first aspect, selecting the plurality of relevant objects comprises selecting the plurality of relevant objects that are external to the collaborative repository from the plurality of URI-addressable objects based on each relevant object of the plurality of relevant objects satisfying the one or more relevance criteria with regard to the request. In further accordance with the first aspect, creating the content in the collaborative repository comprises creating the link to the specified relevant object in the collaborative repository in response to determining that the user selects the specified relevant object.

In a second aspect of the first example method, receiving the request from the user of the collaborative repository comprises receiving the request from the user of the collaborative repository to create a new object in the collaborative repository. In accordance with the second aspect, selecting the plurality of relevant objects comprises selecting a plurality of completed objects from the plurality of URI-addressable objects based on each completed object of the plurality of completed objects satisfying the one or more relevance criteria with regard to the request. In further accordance with the second aspect, recommending the plurality of relevant objects comprises recommending the plurality of completed objects via the user interface based on each completed object of the plurality of completed objects satisfying the one or more relevance criteria. In further accordance with the second aspect, determining that the user selects the specified relevant object comprises determining that the user selects a specified completed object from the plurality of completed objects in response to recommending the plurality of completed objects. In further accordance with the second aspect, creating the content in the collaborative repository comprises creating the new object in the collaborative repository using the specified completed object as a template in response to determining that the user selects the specified completed object. The second aspect of the first example method may be implemented in combination with the first aspect of the first example method, though the example embodiments are not limited in this respect.

In an example of the second aspect of the first example method, receiving the request comprises receiving the request from the user to use a pre-defined template to create the new object. In accordance with this example of the second aspect, selecting the plurality of completed objects comprises selecting the plurality of completed objects based on each completed object of the plurality of completed objects being created using the pre-defined template. In further accordance with this example of the second aspect, recommending the plurality of completed objects comprises recommending the plurality of completed objects based on each completed object of the plurality of completed objects being created using the pre-defined template.

In another example of the second aspect of the first example method, receiving the request comprises receiving the request from the user to create the new object of a designated object type. In accordance with this example of the second aspect, selecting the plurality of completed objects comprises selecting the plurality of completed objects based on each completed object of the plurality of completed objects being of the designated object type. In further accordance with this example of the second aspect, recommending the plurality of completed objects comprises recommending the plurality of completed objects based on each completed object of the plurality of completed objects being of the designated object type. In further accordance with this example of the second aspect, creating the new object comprises creating the new object of the designated object type in the collaborative repository using the specified completed object as the template.

In an implementation of this example, receiving the request comprises receiving the request from the user based on the user selecting the designated object type from a plurality of object types specified in a first menu. In accordance with this implementation, recommending the plurality of completed objects comprises providing a second menu that specifies the plurality of completed objects based on each completed object of the plurality of completed objects being of the designated object type.

In yet another example of the second aspect of the first example method, selecting the plurality of completed objects comprises selecting one or more completed objects based on each of the one or more completed objects being of a designated object type. In accordance with this example of the second aspect, recommending the plurality of completed objects comprises providing a menu that includes a plurality of interface elements that includes first interface elements and second interface elements. The first interface elements identify respective object types that include the designated object type. The second interface elements identify the one or more completed objects of the designated object type. In further accordance with this example of the second aspect, determining that the user selects the specified completed object comprises determining that the user selects the specified completed object from the one or more completed objects in response to providing the menu.

In still another example of the second aspect of the first example method, selecting the plurality of completed objects comprises selecting one or more first completed objects to be included in the plurality of completed objects further based on each of the one or more first completed objects being designated as finalized in a workflow of the respective completed object. In accordance with this example of the second aspect, recommending the plurality of completed objects comprises recommending the one or more first completed objects via the user interface further based on each of the one or more first completed objects being designated as finalized in the workflow of the respective completed object.

In a third aspect of the first example method, selecting the plurality of relevant objects comprises selecting one or more first relevant objects to be included in the plurality of relevant objects based on each of the one or more first relevant objects being created in the collaborative repository within a threshold period of time prior to a reference time. In accordance with the third aspect, recommending the plurality of relevant objects comprises recommending the one or more first relevant objects via the user interface based on each of the one or more first relevant objects being created in the collaborative repository within the threshold period of time prior to the reference time. The third aspect of the first example method may be implemented in combination with the first and/or second aspect of the first example method, though the example embodiments are not limited in this respect.

In a fourth aspect of the first example method, selecting the plurality of relevant objects comprises selecting one or more first relevant objects to be included in the plurality of relevant objects based on each of the one or more first relevant objects being created from a template that is included in a designated library in the collaborative repository. In accordance with the fourth aspect, recommending the plurality of relevant objects comprises recommending the one or more first relevant objects via the user interface based on each of the one or more first relevant objects being created from a template that is included in the designated library in the collaborative repository. The fourth aspect of the first example method may be implemented in combination with the first, second, and/or third aspect of the first example method, though the example embodiments are not limited in this respect.

In a fifth aspect of the first example method, selecting the plurality of relevant objects comprises selecting one or more first relevant objects to be included in the plurality of relevant objects based on each of the one or more first relevant objects being accessed within a threshold period of time prior to a reference time. In accordance with the fifth aspect, recommending the plurality of relevant objects comprises recommending the one or more first relevant objects via the user interface based on each of the one or more first relevant objects being accessed within the threshold period of time prior to the reference time. The fifth aspect of the first example method may be implemented in combination with the first, second, third, and/or fourth aspect of the first example method, though the example embodiments are not limited in this respect.

In a sixth aspect of the first example method, selecting the plurality of relevant objects comprises selecting one or more first relevant objects to be included in the plurality of relevant objects based on each of the one or more first relevant objects being modified within a threshold period of time prior to a reference time. In accordance with the sixth aspect, recommending the plurality of relevant objects comprises recommending the one or more first relevant objects via the user interface based on each of the one or more first relevant objects being modified within the threshold period of time prior to the reference time. The sixth aspect of the first example method may be implemented in combination with the first, second, third, fourth, and/or fifth aspect of the first example method, though the example embodiments are not limited in this respect.

In a seventh aspect of the first example method, selecting the plurality of relevant objects comprises selecting one or more first relevant objects to be included in the plurality of relevant objects based on each of the one or more first relevant objects having metadata that corresponds to one or more keywords that are associated with the collaborative repository. In accordance with the seventh aspect, recommending the plurality of relevant objects comprises recommending the one or more first relevant objects via the user interface based on each of the one or more first relevant objects having the metadata that corresponds to the one or more keywords that are associated with the collaborative repository. The seventh aspect of the first example method may be implemented in combination with the first, second, third, fourth, fifth, and/or sixth aspect of the first example method, though the example embodiments are not limited in this respect.

In an eighth aspect of the first example method, selecting the plurality of relevant objects comprises selecting one or more first relevant objects to be included in the plurality of relevant objects based on each of the one or more first relevant objects being identified by a message that is sent within a threshold period of time prior to a reference time. In accordance with the eighth aspect, recommending the plurality of relevant objects comprises recommending the one or more first relevant objects via the user interface based on each of the one or more first relevant objects being identified by a message that is sent within the threshold period of time prior to the reference time. The eighth aspect of the first example method may be implemented in combination with the first, second, third, fourth, fifth, sixth, and/or seventh aspect of the first example method, though the example embodiments are not limited in this respect.

In a ninth aspect of the first example method, selecting the plurality of relevant objects comprises selecting one or more first relevant objects to be included in the plurality of relevant objects based on each of the one or more first relevant objects being added to a clipboard within a threshold period of time prior to a reference time. In accordance with the ninth aspect, recommending the plurality of relevant objects comprises recommending the one or more first relevant objects via the user interface based on each of the one or more first relevant objects being added to a clipboard within the threshold period of time prior to the reference time. The ninth aspect of the first example method may be implemented in combination with the first, second, third, fourth, fifth, sixth, seventh, and/or eighth aspect of the first example method, though the example embodiments are not limited in this respect.

In a tenth aspect of the first example method, selecting the plurality of relevant objects comprises selecting one or more first relevant objects to be included in the plurality of relevant objects based on each of the one or more first relevant objects having at least one of a number of likes, a number of shares, a number of views, or a number of tags that exceeds a threshold. In accordance with the tenth aspect, recommending the plurality of relevant objects comprises recommending the one or more first relevant objects via the user interface based on each of the one or more first relevant objects having at least one of a number of likes, a number of shares, a number of views, or a number of tags that exceeds the threshold. The tenth aspect of the first example method may be implemented in combination with the first, second, third, fourth, fifth, sixth, seventh, eighth, and/or ninth aspect of the first example method, though the example embodiments are not limited in this respect.

In an eleventh aspect of the first example method, selecting the plurality of relevant objects comprises selecting one or more first relevant objects to be included in the plurality of relevant objects based on each of the one or more first relevant objects having at least one of a number of likes, a number of shares, a number of views, or a number of tags that increases with respect to time at a rate that exceeds a threshold rate. In accordance with the eleventh aspect, recommending the plurality of relevant objects comprises recommending the one or more first relevant objects via the user interface based on each of the one or more first relevant objects having at least one of a number of likes, a number of shares, a number of views, or a number of tags that increases with respect to time at a rate that exceeds the threshold rate. The eleventh aspect of the first example method may be implemented in combination with the first, second, third, fourth, fifth, sixth, seventh, eighth, ninth, and/or tenth aspect of the first example method, though the example embodiments are not limited in this respect.

In a twelfth aspect of the first example method, selecting the plurality of relevant objects comprises selecting one or more first relevant objects to be included in the plurality of relevant objects based on each of the one or more first relevant objects having one or more tags that are used by at least one of the user or a person who is within a designated social proximity to the user within a threshold period of time prior to a reference time. In accordance with the twelfth aspect, recommending the plurality of relevant objects comprises recommending the one or more first relevant objects via the user interface based on each of the one or more first relevant objects having the one or more tags that are used by at least one of the user or the person who is within the designated social proximity to the user within the threshold period of time prior to the reference time. The twelfth aspect of the first example method may be implemented in combination with the first, second, third, fourth, fifth, sixth, seventh, eighth, ninth, tenth, and/or eleventh aspect of the first example method, though the example embodiments are not limited in this respect.

In a thirteenth aspect of the first example method, selecting the plurality of relevant objects comprises selecting one or more first relevant objects to be included in the plurality of relevant objects based on a topic of each of the one or more first relevant objects matching a reference topic. In accordance with the thirteenth aspect, recommending the plurality of relevant objects comprises recommending the one or more first relevant objects via the user interface based on the topic of each of the one or more first relevant objects matching the reference topic. The thirteenth aspect of the first example method may be implemented in combination with the first, second, third, fourth, fifth, sixth, seventh, eighth, ninth, tenth, eleventh, and/or twelfth aspect of the first example method, though the example embodiments are not limited in this respect.

In a fourteenth aspect of the first example method, selecting the plurality of relevant objects comprises selecting one or more first relevant objects to be included in the plurality of relevant objects based on each of the one or more first relevant objects being stored in a store with which the user is associated. In accordance with the fourteenth aspect, recommending the plurality of relevant objects comprises recommending the one or more first relevant objects via the user interface based on each of the one or more first relevant objects being stored in the store with which the user is associated. The fourteenth aspect of the first example method may be implemented in combination with the first, second, third, fourth, fifth, sixth, seventh, eighth, ninth, tenth, eleventh, twelfth, and/or thirteenth aspect of the first example method, though the example embodiments are not limited in this respect.

In a fifteenth aspect of the first example method, recommending the plurality of relevant objects comprises specifying via the user interface, for each of one or more first relevant objects of the plurality of relevant objects, at least one relevance criterion that the respective first relevant object satisfies to cause the respective first relevant object to be recommended via the user interface. The fifteenth aspect of the first example method may be implemented in combination with the first, second, third, fourth, fifth, sixth, seventh, eighth, ninth, tenth, eleventh, twelfth, thirteenth, and/or fourteenth aspect of the first example method, though the example embodiments are not limited in this respect.

In a sixteenth aspect of the first example method, the first example method further comprises receiving an indicator from the user, the indicator specifying at least one user-selected relevance criterion. In accordance with the sixteenth aspect, selecting the plurality of relevant objects comprises selecting the plurality of relevant objects based on each relevant object of the plurality of relevant objects satisfying the one or more relevance criteria, which include the at least one user-selected relevance criterion. The sixteenth aspect of the first example method may be implemented in combination with the first, second, third, fourth, fifth, sixth, seventh, eighth, ninth, tenth, eleventh, twelfth, thirteenth, fourteenth, and/or fifteenth aspect of the first example method, though the example embodiments are not limited in this respect.

In a seventeenth aspect of the first example method, recommending the plurality of relevant objects comprises ranking the plurality of relevant objects based on at least one of an extent to which each relevant object of the plurality of relevant objects satisfies the one or more relevance criteria or a number of criteria that are satisfied by each relevant object of the plurality of relevant objects. The seventeenth aspect of the first example method may be implemented in combination with the first, second, third, fourth, fifth, sixth, seventh, eighth, ninth, tenth, eleventh, twelfth, thirteenth, fourteenth, fifteenth, and/or sixteenth aspect of the first example method, though the example embodiments are not limited in this respect.

In an eighteenth aspect of the first example method, selecting the plurality of relevant objects comprises selecting one or more first relevant objects to be included in the plurality of relevant objects based on a topic of each of the one or more first relevant objects matching a reference topic associated with the collaborative repository. In accordance with the eighteenth aspect, recommending the plurality of relevant objects comprises recommending the one or more first relevant objects via the user interface based on the topic of each of the one or more first relevant objects matching the reference topic that is associated with the collaborative repository. The eighteenth aspect of the first example method may be implemented in combination with the first, second, third, fourth, fifth, sixth, seventh, eighth, ninth, tenth, eleventh, twelfth, thirteenth, fourteenth, fifteenth, sixteenth, and/or seventeenth aspect of the first example method, though the example embodiments are not limited in this respect.

In a nineteenth aspect of the first example method, selecting the plurality of relevant objects comprises selecting one or more first relevant objects to be included in the plurality of relevant objects based on each of the one or more first relevant objects having a name that corresponds to a name of the collaborative repository. In accordance with the nineteenth aspect, recommending the plurality of relevant objects comprises recommending the one or more first relevant objects via the user interface based on each of the one or more first relevant objects having a name that corresponds to the name of the collaborative repository. The nineteenth aspect of the first example method may be implemented in combination with the first, second, third, fourth, fifth, sixth, seventh, eighth, ninth, tenth, eleventh, twelfth, thirteenth, fourteenth, fifteenth, sixteenth, seventeenth, and/or eighteenth aspect of the first example method, though the example embodiments are not limited in this respect.

In a twentieth aspect of the first example method, selecting the plurality of relevant objects comprises selecting one or more first relevant objects to be included in the plurality of relevant objects based on each of the one or more first relevant objects having a name that corresponds to one or more names of one or more respective objects in the collaborative repository. In accordance with the twentieth aspect, recommending the plurality of relevant objects comprises recommending the one or more first relevant objects via the user interface based on each of the one or more first relevant objects having a name that corresponds to the one or more names of the one or more respective objects in the collaborative repository. The twentieth aspect of the first example method may be implemented in combination with the first, second, third, fourth, fifth, sixth, seventh, eighth, ninth, tenth, eleventh, twelfth, thirteenth, fourteenth, fifteenth, sixteenth, seventeenth, eighteenth, and/or nineteenth aspect of the first example method, though the example embodiments are not limited in this respect.

In a second example method of recommending objects to represent a new object type in a new content menu, a request is received from a user to add the new object type in the new content menu. The new content menu includes a plurality of interface elements that correspond to a plurality of respective object types. Each interface element is selectable to create an object of the respective object type. A plurality of relevant objects is selected from a plurality of URI-addressable objects, using at least one element that includes at least one of (a) one or more processors, (b) physical hardware, or (c) electrical circuitry, based on each relevant object of the plurality of relevant objects satisfying one or more relevance criteria with regard to the request. The plurality of relevant objects is recommended via a user interface, using the at least one element, based on each relevant object of the plurality of relevant objects satisfying the one or more relevance criteria. A determination is made that the user selects a specified relevant object from the plurality of relevant objects, using the at least one element, in response to recommending the plurality of relevant objects. The specified relevant object is used to represent the new object type in the new content menu, using the at least one element, in response to determining that the user selects the specified relevant object.

In an aspect of the second example method, using the specified relevant object to represent the new object type in the new content menu comprises creating a new object using the specified relevant object as a template to represent the new object type in the new content menu in response to determining that the user selects the specified relevant object.

In a third example method of recommending objects to add content to a collaborative repository, a determination is made that a user creates the collaborative repository. A plurality of relevant objects that are external to the collaborative repository is selected from a plurality of URI-addressable objects, using at least one element that includes at least one of (a) one or more processors, (b) physical hardware, or (c) electrical circuitry, based on each relevant object of the plurality of relevant objects satisfying one or more relevance criteria with regard to the collaborative repository. The plurality of relevant objects is recommended via a user interface, using the at least one element, based on each relevant object of the plurality of relevant objects satisfying the one or more relevance criteria. A determination is made that the user selects a specified relevant object from the plurality of relevant objects, using the at least one element, in response to recommending the plurality of relevant objects. The content is added to the collaborative repository, using the at least one element, in response to determining that the user selects the specified relevant object, the content being based on the specified relevant object.

In a first aspect of the third example method, adding the content comprises creating the content in the collaborative repository based on the specified relevant object in response to determining that the user selects the specified relevant object.

In an example of the first aspect of the third example method, creating the content comprises creating a link to the specified relevant object in the collaborative repository in response to determining that the user selects the specified relevant object.

In another example of the first aspect of the third example method, creating the content comprises creating a new object in the collaborative repository using the specified relevant object as a template in response to determining that the user selects the specified relevant object.

In a second aspect of the third example method, adding the content comprises making a copy of the specified relevant object. In accordance with the second aspect, adding the content further comprises storing the copy of the specified relevant object in the collaborative repository in response to determining that the user selects the specified relevant object. The second aspect of the third example method may be implemented in combination with the first aspect of the third example method, though the example embodiments are not limited in this respect.

In a third aspect of the third example method, adding the content comprises moving the specified relevant object from a location that is external to the collaborative repository to the collaborative repository in response to determining that the user selects the specified relevant object. The third aspect of the third example method may be implemented in combination with the first and/or second aspect of the third example method, though the example embodiments are not limited in this respect.

A first example system to recommend objects to add content to a collaborative repository comprises an element comprising at least one of (a) a processor, (b) hardware logic, or (c) electrical circuitry. The first example system further comprises selection logic, implemented using the at least one element, configured to select a plurality of relevant objects from a plurality of URI-addressable objects, based on each relevant object of the plurality of relevant objects satisfying one or more relevance criteria with regard to a request from a user of the collaborative repository to create the content in the collaborative repository. The first example system further comprises recommendation logic, implemented using the at least one element, configured to recommend the plurality of relevant objects via a user interface based on each relevant object of the plurality of relevant objects satisfying the one or more relevance criteria. The first example system further comprises determination logic, implemented using the at least one element, configured to determine whether the user selects a specified relevant object from the plurality of relevant objects in response to the plurality of relevant objects being recommended. The first example system further comprises content logic, implemented using the at least one element, configured to create the content in the collaborative repository based on the specified relevant object in response a determination that the user selects the specified relevant object.

In a first aspect of the first example system, the request is a request to create a link in the collaborative repository. In accordance with the first aspect, the selection logic is configured to select the plurality of relevant objects that are external to the collaborative repository from the plurality of URI-addressable objects based on each relevant object of the plurality of relevant objects satisfying the one or more relevance criteria with regard to the request. In further accordance with the first aspect, the creation logic is configured to create the link to the specified relevant object in the collaborative repository in response to the determination that the user selects the specified relevant object.

In a second aspect of the first example system, the request is a request to create a new object in the collaborative repository. In accordance with the second aspect, the selection logic is configured to select a plurality of completed objects from the plurality of URI-addressable objects based on each completed object of the plurality of completed objects satisfying the one or more relevance criteria with regard to the request. In further accordance with the second aspect, the recommendation logic is configured to recommend the plurality of completed objects via the user interface based on each completed object of the plurality of completed objects satisfying the one or more relevance criteria. In further accordance with the second aspect, the determination logic is configured to determine whether the user selects a specified completed object from the plurality of completed objects in response to the plurality of completed objects being recommended. In further accordance with the second aspect, the content logic is configured to create the new object in the collaborative repository using the specified completed object as a template in response to a determination that the user selects the specified completed object. The second aspect of the first example system may be implemented in combination with the first aspect of the first example system, though the example embodiments are not limited in this respect.

In an example of the second aspect of the first example system, the request is a request to use a pre-defined template to create the new object. In accordance with this example of the second aspect, the selection logic is configured to select the plurality of completed objects based on each completed object of the plurality of completed objects being created using the pre-defined template. In further accordance with this example of the second aspect, the recommendation logic is configured to recommend the plurality of completed objects based on each completed object of the plurality of completed objects being created using the pre-defined template.

In another example of the second aspect of the first example system, the request is a request to create the new object of a designated object type. In accordance with this example of the second aspect, the selection logic is configured to select the plurality of completed objects based on each completed object of the plurality of completed objects being of the designated object type. In further accordance with this example of the second aspect, the recommendation logic is configured to recommend the plurality of completed objects based on each completed object of the plurality of completed objects being of the designated object type. In further accordance with this example of the second aspect, the content logic is configured to create the new object of the designated object type in the collaborative repository using the specified completed object as the template.

In an implementation of this example, the selection logic is configured to select the plurality of completed objects in response to the request being received based on the user selecting the designated object type from a plurality of object types specified in a first menu. In accordance with this implementation, the recommendation logic is configured to provide a second menu that specifies the plurality of completed objects based on each completed object of the plurality of completed objects being of the designated object type.

In yet another example of the second aspect of the first example system, the selection logic is configured to select one or more completed objects based on each of the one or more completed objects being of a designated object type. In accordance with this example of the second aspect, the recommendation logic is configured to provide a menu that includes a plurality of interface elements that includes first interface elements and second interface elements. The first interface elements identify respective object types that include the designated object type. The second interface elements identify the one or more completed objects of the designated object type. In further accordance with this example of the second aspect, the determination logic is configured to determine that the user selects the specified completed object from the one or more completed objects in response to the menu being provided.

In still another example of the second aspect of the first example system, the selection logic is configured to select one or more first completed objects to be included in the plurality of completed objects further based on each of the one or more first completed objects being designated as finalized in a workflow of the respective completed object. In accordance with this example of the second aspect, the recommendation logic is configured to recommend the one or more first completed objects via the user interface further based on each of the one or more first completed objects being designated as finalized in the workflow of the respective completed object.

In a third aspect of the first example system, the selection logic is configured to select one or more first relevant objects to be included in the plurality of relevant objects based on each of the one or more first relevant objects being created in the collaborative repository within a threshold period of time prior to a reference time. In accordance with the third aspect, the recommendation logic is configured to recommend the one or more first relevant objects via the user interface based on each of the one or more first relevant objects being created in the collaborative repository within the threshold period of time prior to the reference time. The third aspect of the first example system may be implemented in combination with the first and/or second aspect of the first example system, though the example embodiments are not limited in this respect.

In a fourth aspect of the first example system, the selection logic is configured to select one or more first relevant objects to be included in the plurality of relevant objects based on each of the one or more first relevant objects being created from a template that is included in a designated library in the collaborative repository. In accordance with the fourth aspect, the recommendation logic is configured to recommend the one or more first relevant objects via the user interface based on each of the one or more first relevant objects being created from a template that is included in the designated library in the collaborative repository. The fourth aspect of the first example system may be implemented in combination with the first, second, and/or third aspect of the first example system, though the example embodiments are not limited in this respect.

In a fifth aspect of the first example system, the selection logic is configured to select one or more first relevant objects to be included in the plurality of relevant objects based on each of the one or more first relevant objects being accessed within a threshold period of time prior to a reference time. In accordance with the fifth aspect, the recommendation logic is configured to recommend the one or more first relevant objects via the user interface based on each of the one or more first relevant objects being accessed within the threshold period of time prior to the reference time. The fifth aspect of the first example system may be implemented in combination with the first, second, third, and/or fourth aspect of the first example system, though the example embodiments are not limited in this respect.

In a sixth aspect of the first example system, the selection logic is configured to select one or more first relevant objects to be included in the plurality of relevant objects based on each of the one or more first relevant objects being modified within a threshold period of time prior to a reference time. In accordance with the sixth aspect, the recommendation logic is configured to recommend the one or more first relevant objects via the user interface based on each of the one or more first relevant objects being modified within the threshold period of time prior to the reference time. The sixth aspect of the first example system may be implemented in combination with the first, second, third, fourth, and/or fifth aspect of the first example system, though the example embodiments are not limited in this respect.

In a seventh aspect of the first example system, the selection logic is configured to select one or more first relevant objects to be included in the plurality of relevant objects based on each of the one or more first relevant objects having metadata that corresponds to one or more keywords that are associated with the collaborative repository. In accordance with the seventh aspect, the recommendation logic is configured to recommend the one or more first relevant objects via the user interface based on each of the one or more first relevant objects having the metadata that corresponds to the one or more keywords that are associated with the collaborative repository. The seventh aspect of the first example system may be implemented in combination with the first, second, third, fourth, fifth, and/or sixth aspect of the first example system, though the example embodiments are not limited in this respect.

In an eighth aspect of the first example system, the selection logic is configured to select one or more first relevant objects to be included in the plurality of relevant objects based on each of the one or more first relevant objects being identified by a message that is sent within a threshold period of time prior to a reference time. In accordance with the eighth aspect, the recommendation logic is configured to recommend the one or more first relevant objects via the user interface based on each of the one or more first relevant objects being identified by a message that is sent within the threshold period of time prior to the reference time. The eighth aspect of the first example system may be implemented in combination with the first, second, third, fourth, fifth, sixth, and/or seventh aspect of the first example system, though the example embodiments are not limited in this respect.

In a ninth aspect of the first example system, the selection logic is configured to select one or more first relevant objects to be included in the plurality of relevant objects based on each of the one or more first relevant objects being added to a clipboard within a threshold period of time prior to a reference time. In accordance with the ninth aspect, the recommendation logic is configured to recommend the one or more first relevant objects via the user interface based on each of the one or more first relevant objects being added to a clipboard within the threshold period of time prior to the reference time. The ninth aspect of the first example system may be implemented in combination with the first, second, third, fourth, fifth, sixth, seventh, and/or eighth aspect of the first example system, though the example embodiments are not limited in this respect.

In a tenth aspect of the first example system, the selection logic is configured to select one or more first relevant objects to be included in the plurality of relevant objects based on each of the one or more first relevant objects having at least one of a number of likes, a number of shares, a number of views, or a number of tags that exceeds a threshold. In accordance with the tenth aspect, the recommendation logic is configured to recommend the one or more first relevant objects via the user interface based on each of the one or more first relevant objects having at least one of a number of likes, a number of shares, a number of views, or a number of tags that exceeds the threshold. The tenth aspect of the first example system may be implemented in combination with the first, second, third, fourth, fifth, sixth, seventh, eighth, and/or ninth aspect of the first example system, though the example embodiments are not limited in this respect.

In an eleventh aspect of the first example system, the selection logic is configured to select one or more first relevant objects to be included in the plurality of relevant objects based on each of the one or more first relevant objects having at least one of a number of likes, a number of shares, a number of views, or a number of tags that increases with respect to time at a rate that exceeds a threshold rate. In accordance with the eleventh aspect, the recommendation logic is configured to recommend the one or more first relevant objects via the user interface based on each of the one or more first relevant objects having at least one of a number of likes, a number of shares, a number of views, or a number of tags that increases with respect to time at a rate that exceeds the threshold rate. The eleventh aspect of the first example system may be implemented in combination with the first, second, third, fourth, fifth, sixth, seventh, eighth, ninth, and/or tenth aspect of the first example system, though the example embodiments are not limited in this respect.

In a twelfth aspect of the first example system, the selection logic is configured to select one or more first relevant objects to be included in the plurality of relevant objects based on each of the one or more first relevant objects having one or more tags that are used by at least one of the user or a person who is within a designated social proximity to the user within a threshold period of time prior to a reference time. In accordance with the twelfth aspect, the recommendation logic is configured to recommend the one or more first relevant objects via the user interface based on each of the one or more first relevant objects having the one or more tags that are used by at least one of the user or the person who is within the designated social proximity to the user within the threshold period of time prior to the reference time. The twelfth aspect of the first example system may be implemented in combination with the first, second, third, fourth, fifth, sixth, seventh, eighth, ninth, tenth, and/or eleventh aspect of the first example system, though the example embodiments are not limited in this respect.

In a thirteenth aspect of the first example system, the selection logic is configured to select one or more first relevant objects to be included in the plurality of relevant objects based on a topic of each of the one or more first relevant objects matching a reference topic. In accordance with the thirteenth aspect, the recommendation logic is configured to recommend the one or more first relevant objects via the user interface based on the topic of each of the one or more first relevant objects matching the reference topic. The thirteenth aspect of the first example system may be implemented in combination with the first, second, third, fourth, fifth, sixth, seventh, eighth, ninth, tenth, eleventh, and/or twelfth aspect of the first example system, though the example embodiments are not limited in this respect.

In a fourteenth aspect of the first example system, the selection logic is configured to select one or more first relevant objects to be included in the plurality of relevant objects based on each of the one or more first relevant objects being stored in a store with which the user is associated. In accordance with the fourteenth aspect, the recommendation logic is configured to recommend the one or more first relevant objects via the user interface based on each of the one or more first relevant objects being stored in the store with which the user is associated. The fourteenth aspect of the first example system may be implemented in combination with the first, second, third, fourth, fifth, sixth, seventh, eighth, ninth, tenth, eleventh, twelfth, and/or thirteenth aspect of the first example system, though the example embodiments are not limited in this respect.

In a fifteenth aspect of the first example system, the recommendation logic is configured to specify via the user interface, for each of one or more first relevant objects of the plurality of relevant objects, at least one relevance criterion that the respective first relevant object satisfies to cause the respective first relevant object to be recommended via the user interface. The fifteenth aspect of the first example system may be implemented in combination with the first, second, third, fourth, fifth, sixth, seventh, eighth, ninth, tenth, eleventh, twelfth, thirteenth, and/or fourteenth aspect of the first example system, though the example embodiments are not limited in this respect.

In a sixteenth aspect of the first example system, the selection logic is configured to select the plurality of relevant objects based on each relevant object of the plurality of relevant objects satisfying the one or more relevance criteria, which include at least one user-selected relevance criterion, in response to receipt of an indicator from the user that specifies the at least one user-selected relevance criterion. The sixteenth aspect of the first example system may be implemented in combination with the first, second, third, fourth, fifth, sixth, seventh, eighth, ninth, tenth, eleventh, twelfth, thirteenth, fourteenth, and/or fifteenth aspect of the first example system, though the example embodiments are not limited in this respect.

In a seventeenth aspect of the first example system, the recommendation logic is configured to rank the plurality of relevant objects based on at least one of an extent to which each relevant object of the plurality of relevant objects satisfies the one or more relevance criteria or a number of criteria that are satisfied by each relevant object of the plurality of relevant objects. The seventeenth aspect of the first example system may be implemented in combination with the first, second, third, fourth, fifth, sixth, seventh, eighth, ninth, tenth, eleventh, twelfth, thirteenth, fourteenth, fifteenth, and/or sixteenth aspect of the first example system, though the example embodiments are not limited in this respect.

In an eighteenth aspect of the first example system, the selection logic is configured to select one or more first relevant objects to be included in the plurality of relevant objects based on a topic of each of the one or more first relevant objects matching a reference topic associated with the collaborative repository. In accordance with the eighteenth aspect, the recommendation logic is configured to recommend the one or more first relevant objects via the user interface based on the topic of each of the one or more first relevant objects matching the reference topic that is associated with the collaborative repository. The eighteenth aspect of the first example system may be implemented in combination with the first, second, third, fourth, fifth, sixth, seventh, eighth, ninth, tenth, eleventh, twelfth, thirteenth, fourteenth, fifteenth, sixteenth, and/or seventeenth aspect of the first example system, though the example embodiments are not limited in this respect.

In a nineteenth aspect of the first example system, the selection logic is configured to select one or more first relevant objects to be included in the plurality of relevant objects based on each of the one or more first relevant objects having a name that corresponds to a name of the collaborative repository. In accordance with the nineteenth aspect, the recommendation logic is configured to recommend the one or more first relevant objects via the user interface based on each of the one or more first relevant objects having a name that corresponds to the name of the collaborative repository. The nineteenth aspect of the first example system may be implemented in combination with the first, second, third, fourth, fifth, sixth, seventh, eighth, ninth, tenth, eleventh, twelfth, thirteenth, fourteenth, fifteenth, sixteenth, seventeenth, and/or eighteenth aspect of the first example system, though the example embodiments are not limited in this respect.

In a twentieth aspect of the first example system, the selection logic is configured to select one or more first relevant objects to be included in the plurality of relevant objects based on each of the one or more first relevant objects having a name that corresponds to one or more names of one or more respective objects in the collaborative repository. In accordance with the twentieth aspect, the recommendation logic is configured to recommend the one or more first relevant objects via the user interface based on each of the one or more first relevant objects having a name that corresponds to the one or more names of the one or more respective objects in the collaborative repository. The twentieth aspect of the first example system may be implemented in combination with the first, second, third, fourth, fifth, sixth, seventh, eighth, ninth, tenth, eleventh, twelfth, thirteenth, fourteenth, fifteenth, sixteenth, seventeenth, eighteenth, and/or nineteenth aspect of the first example system, though the example embodiments are not limited in this respect.

A second example system to recommend objects to represent a new object type in a new content menu comprises an element comprising at least one of (a) a processor, (b) hardware logic, or (c) electrical circuitry. The second example system further comprises selection logic, implemented using the at least one element, configured to select a plurality of relevant objects from a plurality of URI-addressable objects based on each relevant object of the plurality of relevant objects satisfying one or more relevance criteria with regard to a request from a user to add the new object type in the new content menu. The new content menu includes a plurality of interface elements that correspond to a plurality of respective object types. Each interface element is selectable to create an object of the respective object type. The second example system further comprises recommendation logic, implemented using the at least one element, configured to recommend the plurality of relevant objects via a user interface based on each relevant object of the plurality of relevant objects satisfying the one or more relevance criteria. The second example system further comprises determination logic, implemented using the at least one element, configured to determine whether the user selects a specified relevant object from the plurality of relevant objects in response to the plurality of relevant objects being recommended. The second example system further comprises content logic, implemented using the at least one element, configured to use the specified relevant object to represent the new object type in the new content menu in response to a determination that the user selects the specified relevant object.

In an aspect of the second example system, the content logic is configured to create a new object using the specified relevant object as a template to represent the new object type in the new content menu in response to the determination that the user selects the specified relevant object.

A third example system to recommend objects to add content to a collaborative repository comprises an element comprising at least one of (a) a processor, (b) hardware logic, or (c) electrical circuitry. The third example system further comprises determination logic, implemented using the at least one element, configured to determine whether a user creates the collaborative repository. The third example system further comprises selection logic, implemented using the at least one element, configured to select a plurality of relevant objects that are external to the collaborative repository from a plurality of URI-addressable objects based on each relevant object of the plurality of relevant objects satisfying one or more relevance criteria with regard to the collaborative repository, in response to a determination that the user creates the collaborative repository. The third example system further comprises recommendation logic, implemented using the at least one element, configured to recommend the plurality of relevant objects via a user interface based on each relevant object of the plurality of relevant objects satisfying the one or more relevance criteria. The determination logic is further configured to determine whether the user selects a specified relevant object from the plurality of relevant objects in response to the plurality of relevant objects being recommended. The third example system further comprises content logic, implemented using the at least one element, configured to add the content to the collaborative repository in response to a determination that the user selects the specified relevant object, the content being based on the specified relevant object.

In a first aspect of the third example system, the content logic is configured to create the content in the collaborative repository based on the specified relevant object in response to the determination that the user selects the specified relevant object.

In an example of the first aspect of the third example system, the content logic is configured to create a link to the specified relevant object in the collaborative repository in response to the determination that the user selects the specified relevant object.

In another example of the first aspect of the third example system, the content logic is configured to create a new object in the collaborative repository using the specified relevant object as a template in response to the determination that the user selects the specified relevant object.

In a second aspect of the third example system, the content logic is configured to making a copy of the specified relevant object and to store the copy of the specified relevant object in the collaborative repository in response to the determination that the user selects the specified relevant object. The second aspect of the third example system may be implemented in combination with the first aspect of the third example system, though the example embodiments are not limited in this respect.

In a third aspect of the third example system, the content logic is configured to move the specified relevant object from a location that is external to the collaborative repository to the collaborative repository in response to the determination that the user selects the specified relevant object. The third aspect of the third example system may be implemented in combination with the first and/or second aspect of the third example system, though the example embodiments are not limited in this respect.

A first example computer program product comprises a computer-readable storage medium having computer program logic recorded thereon for enabling a processor-based system to recommend objects to add content to a collaborative repository. The computer program logic comprises first program logic for enabling the processor-based system to select a plurality of relevant objects from a plurality of URI-addressable objects, based on each relevant object of the plurality of relevant objects satisfying one or more relevance criteria with regard to a request from a user of the collaborative repository to create the content in the collaborative repository. The computer program logic further comprises second program logic for enabling the processor-based system to recommend the plurality of relevant objects via a user interface based on each relevant object of the plurality of relevant objects satisfying the one or more relevance criteria. The computer program logic further comprises third program logic for enabling the processor-based system to determine whether the user selects a specified relevant object from the plurality of relevant objects in response to the plurality of relevant objects being recommended. The computer program logic further comprises fourth program logic for enabling the processor-based system to create the content in the collaborative repository based on the specified relevant object in response a determination that the user selects the specified relevant object.

A second example computer program product comprises a computer-readable storage medium having computer program logic recorded thereon for enabling a processor-based system to recommend objects to represent a new object type in a new content menu. The computer program logic comprises first program logic for enabling the processor-based system to select a plurality of relevant objects from a plurality of URI-addressable objects based on each relevant object of the plurality of relevant objects satisfying one or more relevance criteria with regard to a request from a user to add the new object type in the new content menu. The new content menu includes a plurality of interface elements that correspond to a plurality of respective object types. Each interface element is selectable to create an object of the respective object type. The computer program logic further comprises second program logic for enabling the processor-based system to recommend the plurality of relevant objects via a user interface based on each relevant object of the plurality of relevant objects satisfying the one or more relevance criteria. The computer program logic further comprises third program logic for enabling the processor-based system to determine whether the user selects a specified relevant object from the plurality of relevant objects in response to the plurality of relevant objects being recommended. The computer program logic further comprises fourth program logic for enabling the processor-based system to use the specified relevant object to represent the new object type in the new content menu in response to a determination that the user selects the specified relevant object.

A third example computer program product comprises a computer-readable storage medium having computer program logic recorded thereon for enabling a processor-based system to recommend objects to add content to a collaborative repository. The computer program logic comprises first program logic for enabling the processor-based system to determine whether a user creates the collaborative repository. The computer program logic further comprises second program logic for enabling the processor-based system to select a plurality of relevant objects that are external to the collaborative repository from a plurality of URI-addressable objects based on each relevant object of the plurality of relevant objects satisfying one or more relevance criteria with regard to the collaborative repository, in response to a determination that the user creates the collaborative repository. The computer program logic further comprises third program logic for enabling the processor-based system to recommend the plurality of relevant objects via a user interface based on each relevant object of the plurality of relevant objects satisfying the one or more relevance criteria. The computer program logic further comprises fourth program logic for enabling the processor-based system to determine whether the user selects a specified relevant object from the plurality of relevant objects in response to the plurality of relevant objects being recommended. The computer program logic further comprises fifth program logic for enabling the processor-based system to add the content to the collaborative repository in response to a determination that the user selects the specified relevant object, the content being based on the specified relevant object.

IV. Example Computer System

Figure 10:
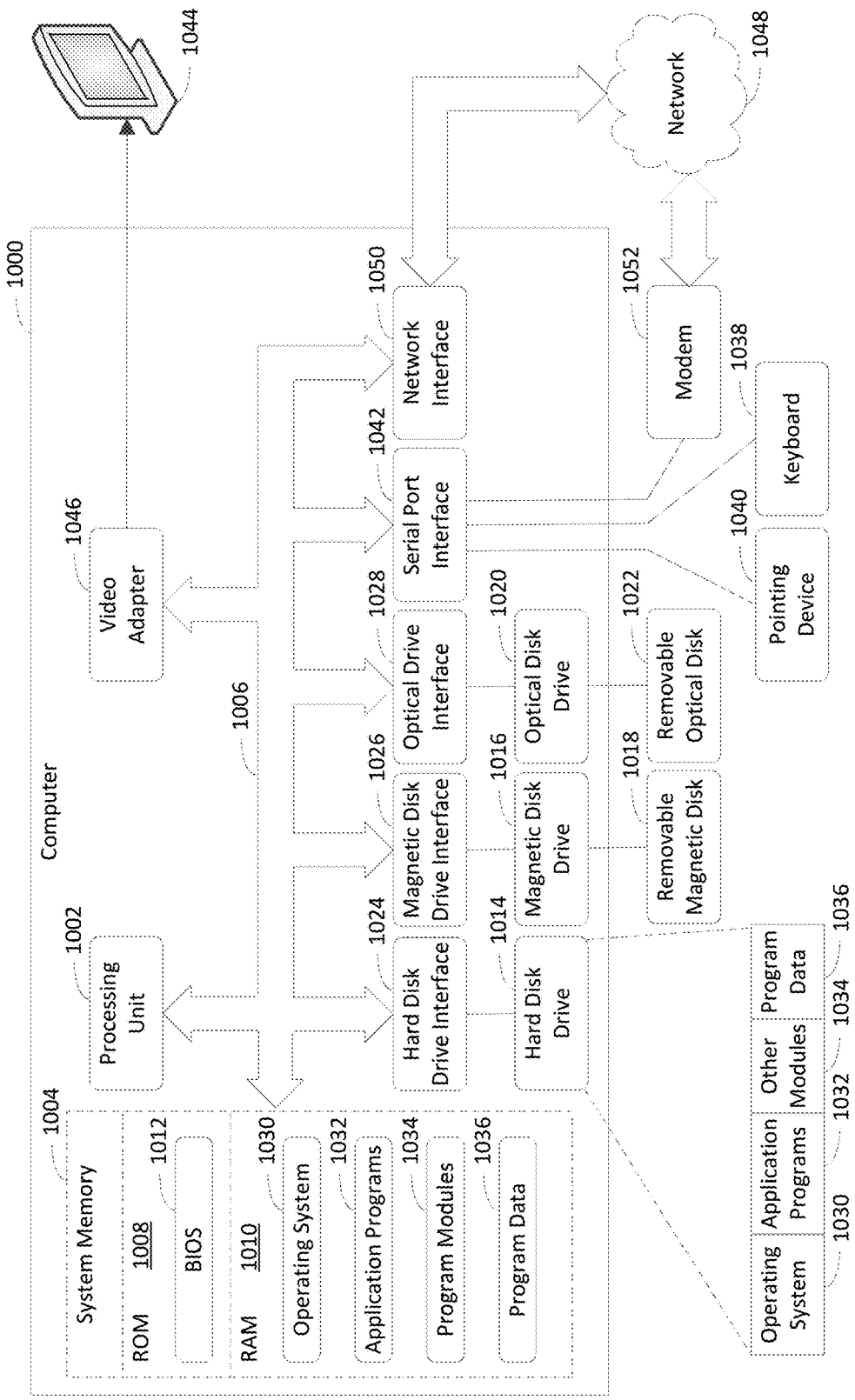
FIG. 10 depicts an example computer in which embodiments may be implemented.

FIG. 10 depicts an example computer 1000 in which embodiments may be implemented. Any one or more of user systems 102A-102M and/or any one or more of servers 106A-106N shown in FIG. 1 and/or computing system 900 shown in FIG. 9 may be implemented using computer 1000, including one or more features of computer 1000 and/or alternative features. Computer 1000 may be a general-purpose computing device in the form of a conventional personal computer, a mobile computer, or a workstation, for example, or computer 1000 may be a special purpose computing device. The description of computer 1000 provided herein is provided for purposes of illustration, and is not intended to be limiting. Embodiments may be implemented in further types of computer systems, as would be known to persons skilled in the relevant art(s).

As shown in FIG. 10, computer 1000 includes a processing unit 1002, a system memory 1004, and a bus 1006 that couples various system components including system memory 1004 to processing unit 1002. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computer 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1030, one or more application programs 1032, other program modules 1034, and program data 1036. Application programs 1032 or program modules 1034 may include, for example, computer program logic for implementing any one or more of relevance-based content logic 110, relevance-based content logic 902, selection logic 904, recommendation logic 906, determination logic 908, content logic 910, flowchart 600 (including any step of flowchart 600), flowchart 700 (including any step of flowchart 700), and/or flowchart 800 (including any step of flowchart 800), as described herein.

A user may enter commands and information into the computer 1000 through input devices such as keyboard 1038 and pointing device 1040. Other input devices (not shown) may include a microphone, joystick, game pad, satellite dish, scanner, touch screen, camera, accelerometer, gyroscope, or the like. These and other input devices are often connected to the processing unit 1002 through a serial port interface 1042 that is coupled to bus 1006, but may be connected by other interfaces, such as a parallel port, game port, or a universal serial bus (USB).

A display device 1044 (e.g., a monitor) is also connected to bus 1006 via an interface, such as a video adapter 1046. In addition to display device 1044, computer 1000 may include other peripheral output devices (not shown) such as speakers and printers.

Computer 1000 is connected to a network 1048 (e.g., the Internet) through a network interface or adapter 1050, a modem 1052, or other means for establishing communications over the network. Modem 1052, which may be internal or external, is connected to bus 1006 via serial port interface 1042.

As used herein, the terms "computer program medium" and "computer-readable storage medium" are used to generally refer to media (e.g., non-transitory media) such as the hard disk associated with hard disk drive 1014, removable magnetic disk 1018, removable optical disk 1022, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050 or serial port interface 1042. Such computer programs, when executed or loaded by an application, enable computer 1000 to implement features of embodiments discussed herein. Accordingly, such computer programs represent controllers of the computer 1000.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to recommend objects to add content to a collaborative repository, the system comprising:
   memory; and
   one or more processors coupled to the memory, the one or more processors configured to:
      select a plurality of relevant objects from a plurality of URI-addressable objects, based on each relevant object of the plurality of relevant objects satisfying one or more relevance criteria with regard to a request from a user of the collaborative repository to create the content in the collaborative repository, wherein the one or more processors are configured to select one or more first relevant objects to be included in the plurality of relevant objects based on each of the one or more first relevant objects being at least one of created, accessed, or modified in the collaborative repository within a threshold period of time prior to a reference time;

recommend the plurality of relevant objects via a user interface based on each relevant object of the plurality of relevant objects satisfying the one or more relevance criteria, wherein the one or more processors are configured to recommend the one or more first relevant objects via the user interface based on each of the one or more first relevant objects being at least one of created, accessed, or modified in the collaborative repository within the threshold period of time prior to the reference time;

determine whether the user selects a specified relevant object from the plurality of relevant objects in response to the plurality of relevant objects being recommended; and create the content in the collaborative repository based on the specified relevant object in response to a determination that the user selects the specified relevant object.

2. The system of claim 1, wherein the request is a request to create a link in the collaborative repository; and wherein the one or more processors are configured to:
select the plurality of relevant objects that are external to the collaborative repository from the plurality of URI-addressable objects based on each relevant object of the plurality of relevant objects satisfying the one or more relevance criteria with regard to the request; and create the link to the specified relevant object in the collaborative repository in response to the determination that the user selects the specified relevant object.

3. The system of claim 1, wherein the request is a request to create a new object in the collaborative repository; and wherein the one or more processors are configured to:
select a plurality of completed objects from the plurality of URI-addressable objects based on each completed object of the plurality of completed objects satisfying the one or more relevance criteria with regard to the request;

recommend the plurality of completed objects via the user interface based on each completed object of the plurality of completed objects satisfying the one or more relevance criteria;

determine whether the user selects a specified completed object from the plurality of completed objects in response to the plurality of completed objects being recommended; and create the new object in the collaborative repository using the specified completed object as a template in response to a determination that the user selects the specified completed object.

4. The system of claim 3, wherein the request is a request to use a pre-defined template object to create the new object in the collaborative repository; and wherein the one or more processors are configured to:
select the plurality of completed objects based on each completed object of the plurality of completed objects being created using the pre-defined template object; and recommend the plurality of completed objects based on each completed object of the plurality of completed objects being created using the pre-defined template object.

5. The system of claim 3, wherein the request is a request to create the new object of a designated object type; and wherein the one or more processors are configured to:
select the plurality of completed objects based on each completed object of the plurality of completed objects being of the designated object type;

recommend the plurality of completed objects based on each completed object of the plurality of completed objects being of the designated object type; and create the new object of the designated object type in the collaborative repository using the specified completed object as the template.

6. The system of claim 5, wherein the one or more processors are configured to:
select the plurality of completed objects in response to the request being received based on the user selecting the designated object type from a plurality of object types specified in a first menu; and provide a second menu that specifies the plurality of completed objects based on each completed object of the plurality of completed objects being of the designated object type.

7. The system of claim 3, wherein the one or more processors are configured to:
select one or more completed objects based on each of the one or more completed objects being of a designated object type;

provide a menu that includes a plurality of interface elements that includes first interface elements and second interface elements, the first interface elements identifying respective object types that include the designated object type, the second interface elements identifying the one or more completed objects of the designated object type; and determine that the user selects the specified completed object from the one or more completed objects in response to the menu being provided.

8. The system of claim 1, wherein the one or more processors are configured to:
select one or more designated relevant objects to be included in the plurality of relevant objects based on each of the one or more designated relevant objects being created from a template that is included in a designated library in the collaborative repository; and recommend the one or more designated relevant objects via the user interface based on each of the one or more designated relevant objects being created from a template that is included in the designated library in the collaborative repository.

9. The system of claim 1, wherein the one or more processors are configured to:
select one or more designated relevant objects to be included in the plurality of relevant objects based on a topic of each of the one or more designated relevant objects matching a reference topic associated with the collaborative repository; and recommend the one or more designated relevant objects via the user interface based on the topic of each of the one or more designated relevant objects matching the reference topic that is associated with the collaborative repository.

10. The system of claim 1, wherein the one or more processors are configured to:
select one or more designated relevant objects to be included in the plurality of relevant objects based on each of the one or more designated relevant objects having a name that corresponds to a name of the collaborative repository; and recommend the one or more designated relevant objects via the user interface based on each of the one or more designated relevant objects having a name that corresponds to the name of the collaborative repository.

11. The system of claim 1, wherein the one or more processors are configured to:
select one or more designated relevant objects to be included in the plurality of relevant objects based on each of the one or more designated relevant objects having a name that corresponds to one or more names of one or more respective objects in the collaborative repository; and
recommend the one or more designated relevant objects via the user interface based on each of the one or more designated relevant objects having a name that corresponds to the one or more names of the one or more respective objects in the collaborative repository.

12. The system of claim 1, wherein the one or more processors are configured to:
select one or more designated relevant objects to be included in the plurality of relevant objects based on each of the one or more designated relevant objects having metadata that corresponds to one or more keywords that are associated with the collaborative repository; and
recommend the one or more designated relevant objects via the user interface based on each of the one or more designated relevant objects having the metadata that corresponds to the one or more keywords that are associated with the collaborative repository.

13. The system of claim 1, wherein the one or more processors are configured to:
select one or more designated relevant objects to be included in the plurality of relevant objects based on each of the one or more designated relevant objects being at least one of added to a clipboard within a threshold period of time prior to a reference time or identified by a message that is sent within the threshold period of time prior to the reference time; and
recommend the one or more designated relevant objects via the user interface based on each of the one or more designated relevant objects being at least one of added to a clipboard within the threshold period of time prior to the reference time or identified by a message that is sent within the threshold period of time prior to the reference time.

14. The system of claim 1, wherein the one or more processors are configured to:
select one or more designated relevant objects to be included in the plurality of relevant objects based on each of the one or more designated relevant objects having at least one of a number of likes that exceeds a threshold, a number of shares that exceeds a threshold, a number of views that exceeds a threshold, or a number of tags that exceeds a threshold; and
recommend the one or more designated relevant objects via the user interface based on each of the one or more designated relevant objects having at least one of a number of likes that exceeds the respective threshold, a number of shares that exceeds the respective threshold, a number of views that exceeds the respective threshold, or a number of tags that exceeds the respective threshold.

15. The system of claim 1, wherein the one or more processors are configured to:
select one or more designated relevant objects to be included in the plurality of relevant objects based on each of the one or more designated relevant objects having at least one of a number of likes that increases with respect to time at a rate that exceeds a threshold rate, a number of shares that increases with respect to time at a rate that exceeds a threshold rate, a number of views that increases with respect to time at a rate that exceeds a threshold rate, or a number of tags that increases with respect to time at a rate that exceeds a threshold rate; and
recommend the one or more designated relevant objects via the user interface based on each of the one or more designated relevant objects having at least one of a number of likes that increases with respect to time at a rate that exceeds the respective threshold rate, a number of shares that increases with respect to time at a rate that exceeds the respective threshold rate, a number of views that increases with respect to time at a rate that exceeds the respective threshold rate, or a number of tags that increases with respect to time at a rate that exceeds the respective threshold rate.

16. The system of claim 1, wherein the one or more processors are configured to:
select one or more designated relevant objects to be included in the plurality of relevant objects based on each of the one or more designated relevant objects having one or more tags that are used by at least one of the user or a person who is within a social proximity to the user within a threshold period of time prior to a reference time; and
recommend the one or more designated relevant objects via the user interface based on each of the one or more designated relevant objects having the one or more tags that are used by at least one of the user or the person who is within the social proximity to the user within the threshold period of time prior to the reference time.

17. The system of claim 1, wherein the one or more processors are configured to:
select one or more designated relevant objects to be included in the plurality of relevant objects based on each of the one or more designated relevant objects being stored in a store with which the user is associated; and
recommend the one or more designated relevant objects via the user interface based on each of the one or more designated relevant objects being stored in the store with which the user is associated.

18. The system of claim 1, wherein the one or more processors are configured to:
specify via the user interface, for each of one or more designated relevant objects of the plurality of relevant objects, at least one relevance criterion that the respective designated relevant object satisfies to cause the respective designated relevant object to be recommended via the user interface.

19. A system to recommend objects to represent a new object type in a new content menu, the system comprising:
memory; and
one or more processors coupled to the memory, the one or more processors configured to:
select a plurality of relevant objects from a plurality of URI-addressable objects based on each relevant object of the plurality of relevant objects satisfying one or more relevance criteria with regard to a request from a user to add the new object type in the new content menu, the new content menu including a plurality of interface elements that correspond to a plurality of respective object types, each interface element being selectable to create an object of the respective object type;

recommend the plurality of relevant objects via a user interface based on each relevant object of the plurality of relevant objects satisfying the one or more relevance criteria;

determine whether the user selects a specified relevant object from the plurality of relevant objects in response to the plurality of relevant objects being recommended; and use the specified relevant object to represent the new object type in the new content menu in response to a determination that the user selects the specified relevant object.

20. The system of claim 19, wherein the one or more processors are configured to:

create a new object using the specified relevant object as a template to represent the new object type in the new content menu in response to the determination that the user selects the specified relevant object.

21. A method of recommending objects to add content to a collaborative repository, the method comprising:

selecting a plurality of relevant objects from a plurality of URI-addressable objects, based on each relevant object of the plurality of relevant objects satisfying one or more relevance criteria with regard to a request from a user of the collaborative repository to create the content in the collaborative repository, said selecting comprising:

selecting one or more first relevant objects to be included in the plurality of relevant objects based on each of the one or more first relevant objects being at least one of created, accessed, or modified in the collaborative repository within a threshold period of time prior to a reference time;

recommending the plurality of relevant objects via a user interface based on each relevant object of the plurality of relevant objects satisfying the one or more relevance criteria, said recommending comprising:

recommending the one or more first relevant objects via the user interface based on each of the one or more first relevant objects being at least one of created, accessed, or modified in the collaborative repository within the threshold period of time prior to the reference time;

determining whether the user selects a specified relevant object from the plurality of relevant objects in response to the plurality of relevant objects being recommended; and creating the content in the collaborative repository based on the specified relevant object in response to a determination that the user selects the specified relevant object.

22. The method of claim 21, wherein the request is a request to create a link in the collaborative repository;

wherein selecting the plurality of relevant objects comprises:

selecting the plurality of relevant objects that are external to the collaborative repository from the plurality of URI-addressable objects based on each relevant object of the plurality of relevant objects satisfying the one or more relevance criteria with regard to the request; and wherein creating the content comprises:

creating the link to the specified relevant object in the collaborative repository in response to the determination that the user selects the specified relevant object.

23. The method of claim 21, wherein selecting the plurality of relevant objects comprises:

selecting one or more designated relevant objects to be included in the plurality of relevant objects based on each of the one or more designated relevant objects having a name that corresponds to one or more names of one or more respective objects in the collaborative repository; and wherein recommending the plurality of relevant objects comprises:

recommending the one or more designated relevant objects via the user interface based on each of the one or more designated relevant objects having a name that corresponds to the one or more names of the one or more respective objects in the collaborative repository.

24. The method of claim 21, wherein selecting the plurality of relevant objects comprises:

selecting one or more designated relevant objects to be included in the plurality of relevant objects based on each of the one or more designated relevant objects having metadata that corresponds to one or more keywords that are associated with the collaborative repository; and wherein recommending the plurality of relevant objects comprises:

recommending the one or more designated relevant objects via the user interface based on each of the one or more designated relevant objects having the metadata that corresponds to the one or more keywords that are associated with the collaborative repository.

25. The method of claim 21, wherein selecting the plurality of relevant objects comprises:

selecting one or more designated relevant objects to be included in the plurality of relevant objects based on each of the one or more designated relevant objects having at least one of a number of likes that exceeds a threshold, a number of shares that exceeds a threshold, a number of views that exceeds a threshold, or a number of tags that exceeds a threshold; and wherein recommending the plurality of relevant objects comprises:

recommend the one or more designated relevant objects via the user interface based on each of the one or more designated relevant objects having at least one of a number of likes that exceeds the respective threshold, a number of shares that exceeds the respective threshold, a number of views that exceeds the respective threshold, or a number of tags that exceeds the respective threshold.

* * * * *